US010382212B2

(12) United States Patent
Zhou et al.

(10) Patent No.: US 10,382,212 B2
(45) Date of Patent: Aug. 13, 2019

(54) METHOD AND DEVICE FOR ACQUIRING MESSAGE CERTIFICATE IN VEHICLE NETWORKING SYSTEM

(71) Applicant: China Academy of Telecommunications Technology, Beijing (CN)

(72) Inventors: Wei Zhou, Beijing (CN); Hui Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 167 days.

(21) Appl. No.: 15/110,691

(22) PCT Filed: Jan. 8, 2015

(86) PCT No.: PCT/CN2015/070343
§ 371 (c)(1),
(2) Date: Jul. 8, 2016

(87) PCT Pub. No.: WO2015/103986
PCT Pub. Date: Jul. 16, 2015

(65) Prior Publication Data
US 2016/0330036 A1    Nov. 10, 2016

(30) Foreign Application Priority Data

Jan. 10, 2014   (CN) .......................... 2014 1 0012806

(51) Int. Cl.
*H04L 9/32* (2006.01)
*H04L 9/00* (2006.01)

(52) U.S. Cl.
CPC ............ *H04L 9/3268* (2013.01); *H04L 9/006* (2013.01); *H04L 2209/84* (2013.01)

(58) Field of Classification Search
CPC .............................. H04L 9/3268; H04L 9/006
See application file for complete search history.

(56) References Cited

U.S. PATENT DOCUMENTS

2008/0222412 A1    9/2008  Hu
2008/0232595 A1*   9/2008  Pietrowicz .............. H04L 9/002
                                                    380/277
(Continued)

FOREIGN PATENT DOCUMENTS

CN          101770553 A     7/2010
CN          101872399 A    10/2010
(Continued)

OTHER PUBLICATIONS

Zhang et al., "An Efficient Message Authentication Scheme for Vehicular Communications", IEEE Transactions of Vehicular Technology, vol. 57, No. 6, Nov. 2008, pp. 3357-3368.*
(Continued)

*Primary Examiner* — Samson B Lemma
*Assistant Examiner* — Carlos E Amorin
(74) *Attorney, Agent, or Firm* — Kilpatrick Townsend & Stockton LLP

(57) ABSTRACT

Provided are a method and device for acquiring a message certificate in a vehicle networking system. The method comprises: receiving, by a Background Control Center (BCC), a privilege certificate request instruction sent by an On-Board Unit (OBU); generating and sending, by the BCC, a write control instruction to the OBU, receiving, by the BCC, an application grant request instruction sent by the OBU, the application grant request instruction being used for applying for use of a privilege certificate already written in the OBU to the BCC; and determining, by the BCC, the valid time for the OBU to use a designated privilege certificate, generating an application control instruction according to the determined valid time, and sending the (Continued)

generated application control instruction to the OBU, the application control instruction being used for indicating that the OBU uses the designated privilege certificate within the valid time.

17 Claims, 9 Drawing Sheets

(56) References Cited

U.S. PATENT DOCUMENTS

| | | | |
|---|---|---|---|
| 2009/0228703 | A1 | 9/2009 | Grajek et al. |
| 2010/0268942 | A1 | 10/2010 | Hernandez-Ardieta et al. |
| 2013/0067220 | A1 | 3/2013 | Ando et al. |
| 2015/0139241 | A1* | 5/2015 | Vincent ............... H04L 67/1097 370/392 |

FOREIGN PATENT DOCUMENTS

| | | | |
|---|---|---|---|
| CN | 102087786 A | 6/2011 | |
| CN | 102907039 A | 1/2013 | |

OTHER PUBLICATIONS

International Search Report corresponding to PCT/CN2015/070343.

* cited by examiner

METHOD AND DEVICE FOR ACQUIRING MESSAGE CERTIFICATE IN VEHICLE NETWORKING SYSTEM

This application is a US National Stage of International Application PCT/CN2015/070343, filed on Jan. 8, 2015, designating the United States, and claiming the benefit of Chinese Patent Application No. 201410012806.2, filed with the State Intellectual Property Office of People's Republic of China on Jan. 10, 2014 and entitled "Method and device for obtaining a message certificate in an internet of vehicles system", which is hereby incorporated by reference in its entirety.

FIELD

The present invention relates to the field of internet of vehicles, and particularly to a method and device for obtaining a message certificate in an internet of vehicles system.

BACKGROUND

The internet of vehicles is primarily applied for the purpose of reducing the number of traffic accidents occurring. In the internet of vehicles system, an On-Board Unit (OBU) on a vehicle monitors the position and traveling information of the vehicle, and broadcasts the information to the surrounding vehicles, and also the OBU on the vehicle further receives the information sent by the OBUs on the other vehicles; and the OBU on the vehicle analyzes the traveling information of the current vehicle and the other vehicles, and notifies a driver of a possible accident threat in a timely manner.

For the sake of security, in the internet of vehicles system, a certificate for the vehicle to issue a message broadcasted by the vehicle is referred to as a message certificate. Respective privileges possessed by the vehicle are typically stored in the message certificate, e.g., an internet of vehicles specific certificate defined in the IEEE 1609.2. The message certificate is typically sent to the receiver together with the issued message so that the message receiver can authenticate the received message. The message certificate includes a public key for verifying a signature of the message, and a description of the privileges of the sender. In the internet of vehicles system, each of the vehicles possesses a normal message certificate describing the lowest pass privilege. In addition to the normal message certificate, a special vehicle possessing a higher pass privilege possesses a special message certificate describing its higher pass privilege. In this case, the privileges possessed by the special vehicle are the sum of the privileges described by all its message certificates. The respective message certificates applied in the internet of vehicles system are issued by a Certificate Authority (CA) in some flow which particularly includes requesting, reviewing, issuing, distributing, and other processes.

However in some urgent cases, for example, if there is a serious patient to be delivered to a hospital, there is some special material to be transported, etc., then a civilian vehicle may also need a priority pass privilege. A message certificate required for the vehicle needing the high priority pass privilege can not be issued to the vehicle in the existing message certificate issuing flow in the urgent case because it may take such a long period of time for requesting for the certificate in which the urgent event can not be handled in a timely manner; and furthermore if required data communication means is unavailable (for example, data can not be transmitted between the OBU and the CA) while the event is occurring, then the message certificate can not be issued in the prior art.

At present, the internet of vehicles is being investigated and the related standards thereof are being developed, so numerous issues thereof have been ignored. None of the related technological standards has been concerned so far with a technical solution to issue a message certificate required for a vehicle needing a high priority pass privilege in an urgent case, and no related research effort has been identified to address this issue.

SUMMARY

Embodiments of the invention provide a method and device for obtaining a message certificate in an internet of vehicles system so as to address the problem of issuing a message certificate required for a vehicle needing a high priority pass privilege in an urgent case.

The invention provides a method for obtaining a message certificate at the BCC side in an internet of vehicles system, the method including:

receiving, by a BCC, an application grant request instruction sent by an On-Board Unit (OBU), wherein the application grant request instruction requests the BCC for applying a privilege certificate written in the OBU; and determining, by the BCC, a valid time in which the OBU applies the specified privilege certificate, generating an application control instruction according to the valid time, and sending the generated application control instruction to the OBU, wherein the application control instruction instructs the OBU to apply the specified privilege certificate in the valid time.

The invention provides a method for obtaining a message certificate at the OBU side in an internet of vehicles system, the method including:

if an OBU needs to issue a message using a privilege certificate, then sending an application grant request instruction to a Background Control Center (BCC), wherein the application grant request instruction requests the BCC for applying the privilege certificate written in the OBU; and upon reception of an application control instruction sent by the BCC, issuing, by the OBU, the message using the privilege certificate specified by the BCC in a valid time specified by the BCC according to the application control instruction, and broadcasting the issued message to the other OBUs than the OBU.

The invention provides a BCC including:

a receiving and sending module configured to receive an application grant request instruction sent by an OBU, wherein the application grant request instruction requests the BCC for applying a privilege certificate written in the OBU; and a processing module configured to determine a valid time in which the OBU applies the specified privilege certificate, to generate an application control instruction according to the valid time, and to send the generated application control instruction to the OBU, wherein the application control instruction instructs the OBU to apply the specified privilege certificate in the valid time.

The invention provides an OBU including:

a receiving and sending module configured, if the OBU needs to issue a message using a privilege certificate, to send an application grant request instruction to a BCC, wherein the application grant request instruction requests the BCC for applying the privilege certificate written in the OBU; and to receive an application control instruction sent by the BCC; and a processing module configured, after the receiving and sending module receives the application control instruction sent by the BCC, to issue the message using the privilege certificate specified by the BCC in a valid time specified by the BCC according to the application control instruction, and to broadcast the issued message to the other OBUs than the OBU.

The invention provides another BCC including a transceiver, at least one processor connected with the transceiver, and a memory connected respectively with the transceiver and the processor:

the transceiver is configured to receive an application grant request instruction sent by an OBU, wherein the application grant request instruction requests the BCC for applying a privilege certificate written in the OBU; and the processor is configured to determine a valid time in which the OBU applies the specified privilege certificate, to generate an application control instruction according to the valid time, and to trigger the transceiver to send the generated application control instruction to the OBU, wherein the application control instruction instructs the OBU to apply the specified privilege certificate in the valid time.

The invention provides an OBU including a transceiver, at least one processor connected with the transceiver, and a memory connected respectively with the transceiver and the processor:

the transceiver is configured, if the OBU needs to issue a message using a privilege certificate, to send an application grant request instruction to a BCC, wherein the application grant request instruction requests the BCC for applying the privilege certificate written in the OBU; and to receive an application control instruction sent by the BCC; and the processor is configured to issue the message using the privilege certificate specified by the BCC in a valid time specified by the BCC according to the application control instruction, and to broadcast the issued message to the other OBUs than the OBU.

DETAILED DESCRIPTION OF THE EMBODIMENTS

The invention provides a mechanism of requesting for and applying a message certificate, which can issue in advance a privilege certificate with a higher pass privilege to any on-board unit, but authorize the OBU to access the privilege of the privilege certificate only if necessary, so that a normal vehicle can also possess the higher priority pass privilege in an urgent case.

In the embodiments of the invention, the high pass priority certificate issued to any vehicle will be referred to as a privilege certificate. The structure of the privilege certificate is the same as a normal message certificate, but the privilege certificate shall be issued and applied in compliance with a specialized mechanism. The privilege certificate is typically unavailable, and the application of the privilege certificate shall be authorized by a Background Control Center (BCC), where the privilege certificate can be applied in a specified valid time, and the privilege certificate will automatically become unavailable at the end of the valid time.

Figure 1:
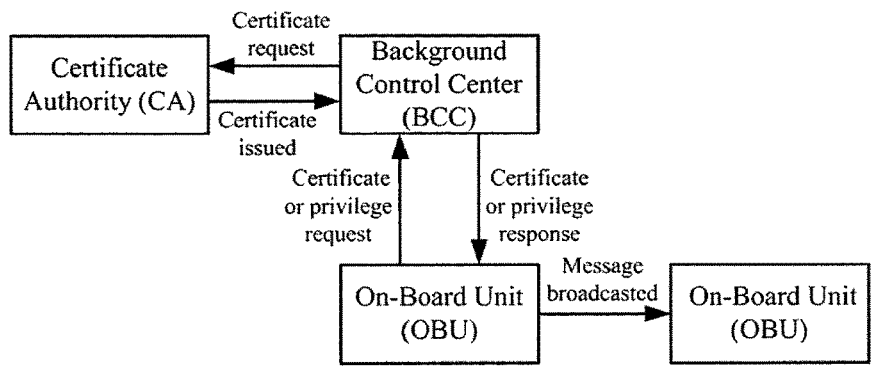
FIG. 1 is a schematic architectural diagram of a vehicle privilege certification application system in an internet of vehicles system according to an embodiment of the invention.

Firstly respective entities involved in the embodiments of the invention will be described below, and FIG. 1 illustrates the architecture of a vehicle privilege certificate application system in an internet of vehicles system, where the system includes a Certificate Authority (CA), a BCC, and OBUs, where general functions of the respective entities are as follows.

The CA is responsible for issuing various certificates, e.g., a message certificate, a privilege certificate, etc., to an internet of vehicles device which can include an OBU and a Road Side Unit (RSU);

The BCC is responsible for generating a key pair for the OBU, and requesting for a certificate from the CA, and then writing the obtained certificate and the key pair into the OBU in a secure manner; and the BCC is further responsible for managing vehicle privilege certificates, where the BCC can grant applications of the privilege certificates as required;

The OBU firstly requests the BCC for the privilege certificate desirable thereto, and the key pair corresponding to the privilege certificate, and then requests the BCC for an application grant to the certificate, and thereafter issues a message broadcasted by the OBU using the obtained certificate.

There are the following flows related to an application of the privilege certificate in the internet of vehicles.

The privilege certificate is requested for and written: the BCC generates the key pair, and requests the CA for the message certificate using the OBU information, and then writes the certificate and the key pair into the OBU using a dedicated instruction in response to the request of the OBU.

The application grant to the privilege certificate is requested for and written: the BCC writes the application grant to the privilege certificate into the OBU using a dedicated instruction in response to the request of the OBU.

The privilege certificate is applied: the OBU issues the message using the currently available privilege certificate, and then broadcasts it to the other OBUs.

The embodiments of the invention will be further described below in details with reference to the drawings. It shall be appreciated that the embodiments described here are merely intended to illustrate and describe the invention, but not to limit the invention.

Figure 2:
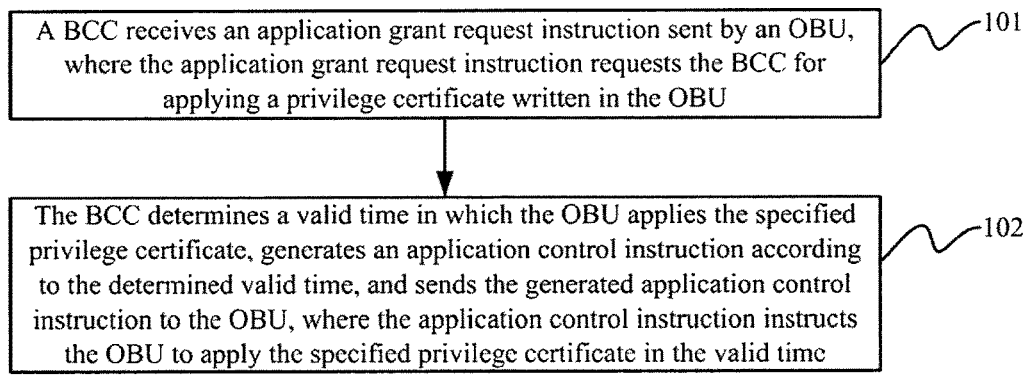
FIG. 2 is a schematic diagram of a method for obtaining a message certificate at the BCC side in the internet of vehicles system according to an embodiment of the invention.

Referring to FIG. 2, an embodiment of the invention provides a method for obtaining a message certificate at the BCC side in an internet of vehicles, where the method includes the following steps.

In the step 101, a BCC receives an application grant request instruction sent by an OBU, where the application grant request instruction requests the BCC for applying a privilege certificate written in the OBU.

Before this step, the BCC has requests for at least one privilege certificate for the OBU, and writes both the requested privilege certificate, and a key pair generated by the BCC for each requested privilege certificate into the OBU for storage, but the privilege certificate is normally unavailable to the OBU, and an application of any privilege certificate by the OBU shall be authorized by the BCC, where the privilege certificate can be applied in a limited period of time specified by the BCC, and the privilege certificate will become unavailable again at the end of the valid time. Thus if the OBU needs to apply the privilege certificate, then the OBU will send the application grant request instruction to the BCC to request the BCC for an application of the privilege certificate written into the OBU.

In this step, the application grant request instruction includes an instruction identifier identifying the type of the current instruction, an OBU identifier (ID) identifying the OBU uniquely, and a random number (Random) generated by the OBU.

Particularly the application grant request instruction includes the CMD, the OBU ID, and the OBU Random, where the CMD is the instruction identifier identifying the current instruction as the application grant request instruction.

It shall be noted that bidirectional authentication is not required between the BCC and the OBU before this step is performed.

In the step 102, the BCC determines a valid time in which the OBU applies the specified privilege certificate, generates an application control instruction according to the determined valid time, and sends the generated application control instruction to the OBU, where the application control instruction instructs the OBU to apply the specified privilege certificate in the valid time.

Particularly the BCC reviews the application grant request instruction sent by the OBU upon reception of the application grant request instruction of the OBU, and specifies the privilege certificate applicable to the OBU, and the valid time in which the OBU applies the specified privilege certificate upon determining that the OBU can apply the privilege certificate; and then generates and sends the corresponding application control instruction to the OBU to instruct the OBU to apply the specified privilege certificate in the valid time.

In this step, the application control instruction includes: a version number of a currently applied privilege certificate management key (OBU Key Version), an instruction identifier identifying the current instruction, the random number carried in the application grant request instruction, a certificate number (Certificate Number) of the currently applied privilege certificate, and the valid time.

Particularly the application control instruction includes: the OBU Key Version, the CMD, the OBU Random the Certificate Number, a Start Time, and a Duration, where the CMD is the instruction identifier identifying the current instruction as the application control instruction, the Certificate Number is an internal number used between the BCC and the OBU to identify the privilege certificate issued by the CA; and the Start Time and the Duration represent the valid time, where the Start Time represents a start time at which the privilege certificate is valid, and the Duration represents the length of time for which the privilege certificate is valid.

It shall be noted that the valid time in which the privilege certificate can be applied can be represented in another representation in addition to the representation above, for example, the start time and an end time at which the privilege certificate is valid represent the valid time in which the privilege certificate can be applied.

In an embodiment of the invention, the BCC receives the application grant request instruction sent by the OBU, and the BCC determines the valid time in which the OBU applies the specified privilege certificate, generates the application control instruction according to the determined valid time, and sends the generated application control instruction to the OBU, so that the OBU can apply the privilege certificate specified by the BCC in the valid time determined by the BCC, and thus the OBU can have a priority pass privilege in the valid time determined by the BCC.

In an implementation, the BCC receives the application grant request instruction sent by the OBU in the step 101 particularly in the following two approaches.

In a first approach, the BCC receives the application grant request instruction sent by the OBU over a data transmission link.

This approach will be applicable if there is a network connection between the BCC and the OBU, where the BCC interacts with the OBU by transmitting over the network to thereby authorize an application of the privilege certificate.

In a second approach, the BCC receives the application grant request instruction sent by the OBU through voice transmission.

This approach will be applicable if there is no network connection between the BCC and the OBU, where the BCC interacts with the OBU through voice transmission to thereby authorize an application of the privilege certificate.

In an implementation, in order to secure data transmission, the BCC generates the application control instruction according to the determined valid time, and sends the application control instruction to the OBU in the step 102 particularly as follows.

The BCC generates the application control instruction according to the determined valid time, encrypts the information included in the application control instruction, and sends the encrypted application control instruction to the OBU.

Figure 3:
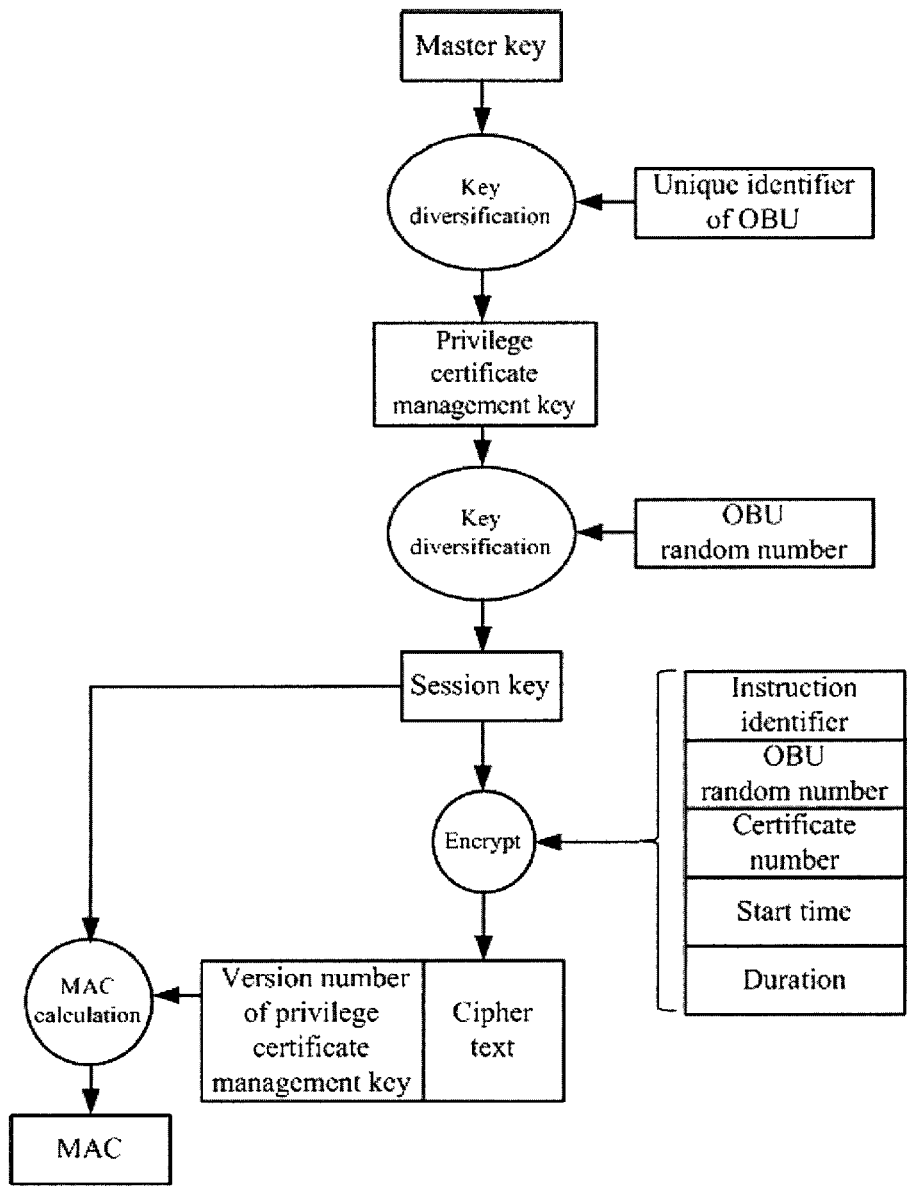
FIG. 3 is a schematic diagram of a process of encrypting information included in an application control instruction by the BCC according to an embodiment of the invention.

Here the BCC encrypts the information included in the application control instruction in the following process as illustrated in FIG. 3.

The BCC performs key diversification on the random number carried in the application grant request instruction according to the determined privilege certificate management key (OBU Key) to generate a session key;

The BCC encrypts the instruction identifier, in the application control instruction, identifying the type of the current instruction, the random number carried in the application grant request instruction, the number of the specified privilege certificate, and the determined valid time, using the generated session key to obtain a cipher text; and the BCC calculates a Message Authentication Code (MAC) from the version number of the determined privilege certificate management key, and the obtained cipher text, using the generated session key, where the encrypted application control instruction includes the version number of the determined privilege certificate management key, the obtained cipher text, and the obtained MAC.

In the process above, the BCC determines the privilege certificate management key particularly as follows: the BCC selects one of its master keys, and performs key diversification on the OBU ID using the selected master key to obtain the privilege certificate management key of the OBU, where the BCC can have a number of master keys with different version numbers, so the BCC can generate a privilege certificate management key for the OBU according to each master key and the OBU ID.

In the process above, the key for calculating the MAC is the session key; or of course, the key for calculating the MAC can alternatively be a key calculated separately and different from the session key.

In an implementation, before the BCC receives the certificate application grant request instruction sent by the OBU, the method further includes:

The BCC generates at least one privilege certificate management key corresponding to the OBU according to its at least one master key, and the identifier of the OBU, and sends the at least one privilege certificate management key to the OBU.

It shall be noted that the BCC firstly performs key diversification using its master key, and the OBU ID of the OBU to obtain the at least one privilege certificate management key (OBU key) corresponding to the OBU before requesting for the privilege certificate for the OBU, that is, OBU keys of different OBUs are different from each other, and each OBU can also have a number of OBU keys, where the OBU keys corresponding to each OBU are identified by their numbers, and the BCC decides on particularly which one of the OBU keys is to be applied.

In an embodiment of the invention, before the privilege certificate is granted for authorization, the method further includes a process of requesting for the privilege certificate, and particularly, before the BCC receives the certificate application grant request instruction sent by the OBU, the method further includes:

The BCC generates the pair key corresponding to the privilege certificate of the OBU, where the generated pair key including a public key and a private key;

The BCC generates a privilege certificate request instruction corresponding to the OBU according to the generated public key, and the related information of the OBU (e.g., the OBU ID, and other information related to requesting for the privilege certificate), and sends the privilege certificate request instruction to the Certificate Authority (CA); and The BCC receives and stores the privilege certificate issued by the CA in response to the privilege certificate request instruction.

Furthermore after the BCC receives the privilege certificate issued by the CA, and before the BCC receives the application grant request instruction sent by the OBU, the method further includes:

The BCC sends a notification message to the OBU to notify the OBU that the BCC has requested for the privilege certificate of the OBU, so that the OBU sends the application grant request instruction to the BCC.

In an implementation, after the BCC receives the privilege certificate issued by the CA, and before the BCC receives the application grant request instruction sent by the OBU, the method further includes a process of writing the privilege certificate particularly as follows.

The BCC receives the privilege certificate request instruction sent by the OBU, where the privilege certificate request instruction requests for writing the privilege certificate requested by the BCC into the OBU;

The BCC generates and sends a write control instruction to the OBU, where the write control instruction includes at least the privilege certificate requested by the BCC for the OBU, and the key pair generated by the BCC for the privilege certificate.

In the process above, the privilege certificate request instruction includes an instruction identifier identifying the type of the current instruction, the OBU identifier identifying the OBU uniquely, and the random number generated by the OBU.

Particularly the privilege certificate request instruction includes the CMD, the OBU ID, and the OBU Random, where the CMD is an instruction identifier identifying the current instruction as the privilege certificate request instruction.

In the process above, the write control instruction generated by the BCC includes the version number of the currently used privilege certificate management key, an instruction identifier identifying the type of the current instruction, the random number carried in the privilege certificate request instruction, the requested privilege certificate, the certificate number defined by the BCC for the privilege certificate, the key pair generated by the BCC for the privilege certificate, and a time identifier identifying the valid time of the privilege certificate, where the time identifier includes the identifier of the start time at which the privilege certificate is valid, and the identifier of the validity length of time of the privilege certificate.

Particularly the write control instruction includes the OBU key version, the CMD, the OBU Random, the Certificate Number, the Certificate, the Key Pair, the Start Time, and the Duration, where the CMD is the instruction identifier identifying the current instruction as the write control instruction, and the Certificate Number is an internal number used between the BCC and the OBU to identify the privilege certificate issued by the CA.

It shall be noted that the valid time in which the privilege certificate can be applied can be represented in another representation in addition to the representation above, for example, the start time and the end time at which the privilege certificate is valid represent the valid time in which the privilege certificate can be applied.

In an implementation, in order to secure data transmission, the BCC generates and sends the write control instruction to the OBU particularly as follows.

The BCC generates the write control instruction, encrypts the information included in the generated write control instruction, and sends the encrypted write control instruction to the OBU.

Figure 4:
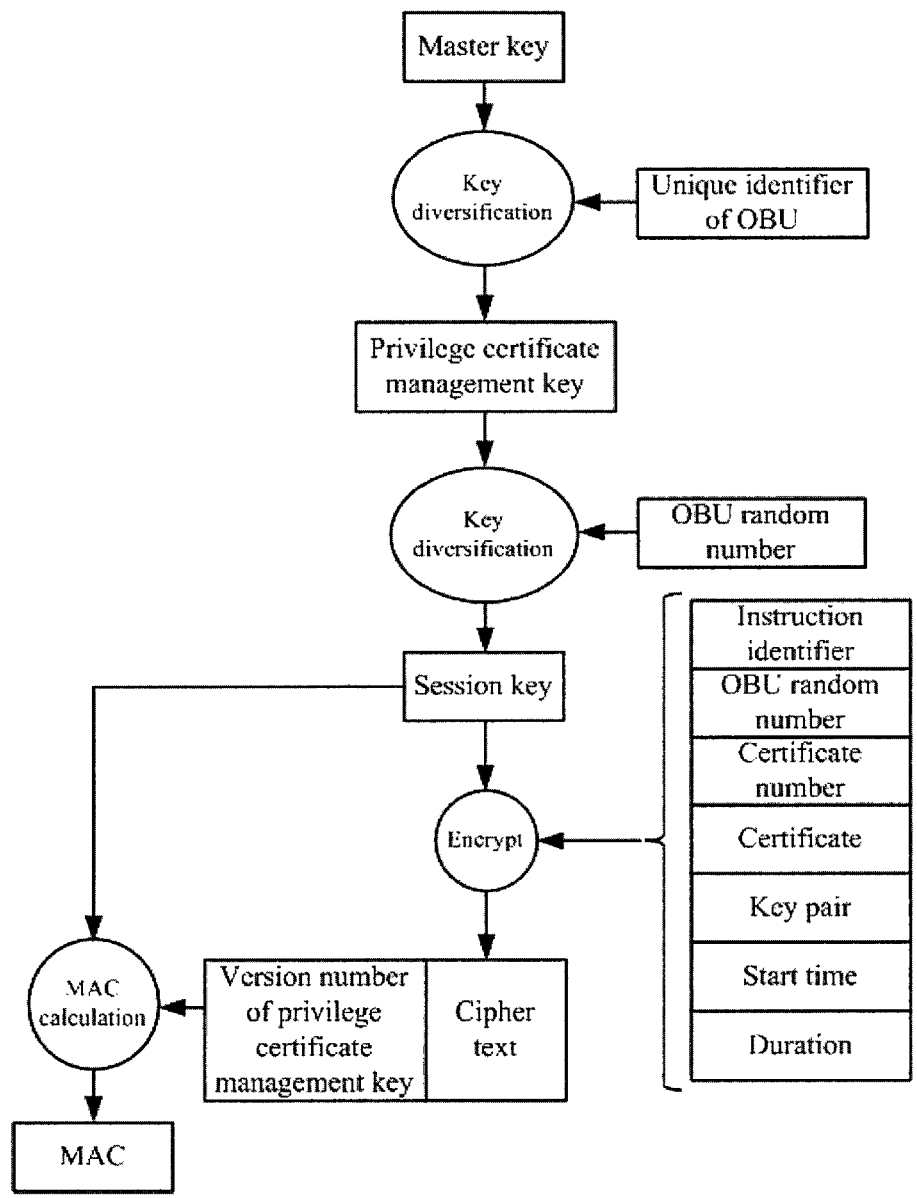
FIG. 4 is a schematic diagram of a process of encrypting information included in a generated write control instruction by the BCC according to an embodiment of the invention.

Here the BCC encrypts the information included in the generated write control instruction in the following process as illustrated in FIG. 4.

The BCC performs key diversification on the random number carried in the write control instruction using the determined privilege certificate management key to generate a session key;

The BCC encrypts the instruction identifier, in the generated write control instruction, identifying the type of the current instruction, the random number carried in the privilege certificate request instruction, the requested privilege certificate, the certificate number defined by the BCC for the privilege certificate, the key pair generated by the BCC for the privilege certificate, and the time identifier identifying the valid time of the privilege certificate, using the generated session key to obtain a cipher text;

The BCC calculates an MAC from the version number of the determined privilege certificate management key, and the obtained cipher text, using the generated session key, where the encrypted write control instruction includes the version number of the determined privilege certificate management key, the obtained cipher text, and the obtained MAC.

In the process above, the BCC determines the privilege certificate management key particularly as follows: the BCC selects one of its master keys, and performs key diversification on the OBU ID using the selected master key to obtain the privilege certificate management key of the OBU, where the BCC can have a number of master keys with different version numbers, so the BCC can generate a privilege certificate management key for the OBU according to each master key and the OBU ID. That is, OBU keys of different OBUs are different from each other, and each OBU can also have a number of OBU keys, where the OBU keys corresponding to each OBU are identified by their numbers, and the BCC decides on particularly which one of the OBU keys is to be applied.

In the process above, the key for calculating the MAC is the session key; or of course, the key for calculating the MAC can alternatively be a key calculated separately and different from the session key.

In an implementation, before the BCC sends the privilege certificate request instruction to the CA, the method further includes:

The BCC generates the at least one privilege certificate management key corresponding to the OBU according to its at least one master key, and the identifier of the OBU, and sends the at least one privilege certificate management key to the OBU.

Figure 5:
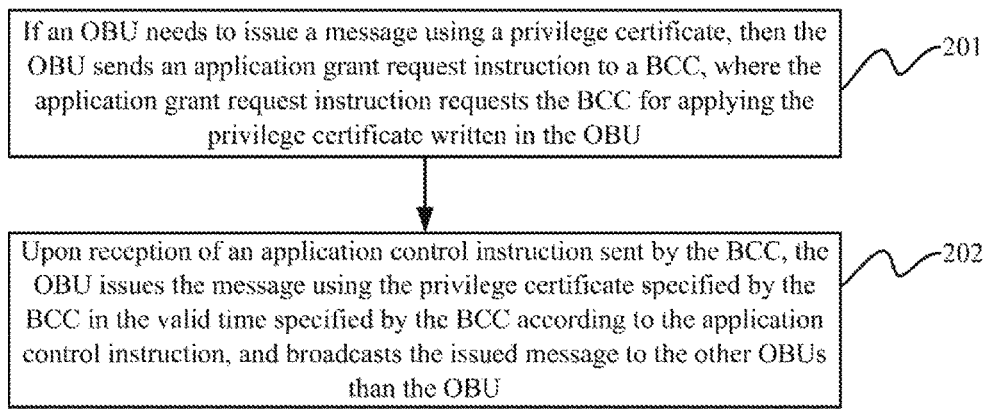
FIG. 5 is a schematic diagram of a method for obtaining a message certificate at the OBU side in the internet of vehicles system according to an embodiment of the invention.

Based upon the same inventive concept, an embodiment of the invention further provides a method for obtaining a message certificate at the OBU side in an internet of vehicles as illustrated in FIG. 5, where the method includes the following steps.

In the step 201, if an OBU needs to issue a message using a privilege certificate, then the OBU sends an application grant request instruction to a BCC, where the application grant request instruction requests the BCC for applying the privilege certificate written in the OBU.

Before this step, the BCC has requests for at least one privilege certificate for the OBU, and writes both the requested privilege certificate, and a key pair generated by the BCC for each requested privilege certificate into the OBU for storage, but the privilege certificate is normally unavailable to the OBU, and an application of any privilege certificate by the OBU shall be authorized by the BCC, where the privilege certificate can be applied in a limited period of time specified by the BCC, and the privilege certificate will become unavailable again at the end of the valid time. Thus if the OBU needs to apply the privilege certificate, then the OBU will send an application grant request instruction to the BCC to request the BCC for an application of the privilege certificate written into the OBU.

In this step, the application grant request instruction includes an instruction identifier identifying the type of the current instruction, an OBU ID identifying the OBU uniquely, and a random number (Random) generated by the OBU.

Particularly the application grant request instruction includes the CMD, the OBU ID, and the OBU Random, where the CMD is the instruction identifier identifying the current instruction as the application grant request instruction.

In the step 202, upon reception of an application control instruction sent by the BCC, the OBU issues the message using the privilege certificate specified by the BCC in the valid time specified by the BCC according to the application control instruction, and broadcasts the issued message to the other OBUs than the OBU.

In this step, the application control instruction includes: a version number of a currently applied privilege certificate management key (OBU Key Version), an instruction identifier identifying the current instruction, the random number carried in the application grant request instruction, a certificate number (Certificate Number) of the currently applied privilege certificate, and the valid time.

Particularly the application control instruction includes: the OBU Key Version, the CMD, the OBU Random, the Certificate Number, a Start Time, and a Duration, where the CMD is the instruction identifier identifying the current instruction as the application control instruction, the Certificate Number is an internal number used between the BCC and the OBU to identify the privilege certificate issued by a CA; and the Start Time and the Duration represent the valid time, where the Start Time represents a start time at which the privilege certificate is valid, and the Duration represents the length of time for which the privilege certificate is valid.

It shall be noted that the valid time in which the privilege certificate can be applied can be represented in another representation in addition to the representation above, for example, the start time and an end time at which the privilege certificate is valid represent the valid time in which the privilege certificate can be applied.

In an embodiment of the invention, if the OBU needs to issues the message using the privilege certificate, then the OBU will send the application grant request instruction to the BCC, and upon reception of the application control instruction sent by the BCC, the OBU issues the message using the privilege certificate specified by the BCC in the valid time specified by the BCC according to the application control instruction, and broadcasts the issued message to the other OBUs than the OBU, so that the OBU can apply the privilege certificate specified by the BCC in the valid time determined by the BCC, and thus the OBU can have a priority pass privilege in the valid time determined by the BCC.

In an implementation, the OBU sends the application grant request instruction to the BCC in the step 201 particularly in the following two approaches.

In a first approach, the OBU sends the application grant request instruction to the BCC over a data transmission link.

This approach will be applicable if there is a network connection between the BCC and the OBU, where the BCC interacts with the OBU by transmitting over the network to thereby authorize an application of the privilege certificate.

In a second approach, the OBU sends the application grant request instruction to the BCC through voice transmission.

This approach will be applicable if there is no network connection between the BCC and the OBU, where the BCC interacts with the OBU through voice transmission to thereby authorize an application of the privilege certificate.

In an implementation, in order to secure data transmission, after the OBU receives the application control instruction sent by the BCC in the step 202, the method further includes:

The OBU authenticates and decrypts the received application control instruction to obtain and store the information included in the application control instruction.

Figure 6:
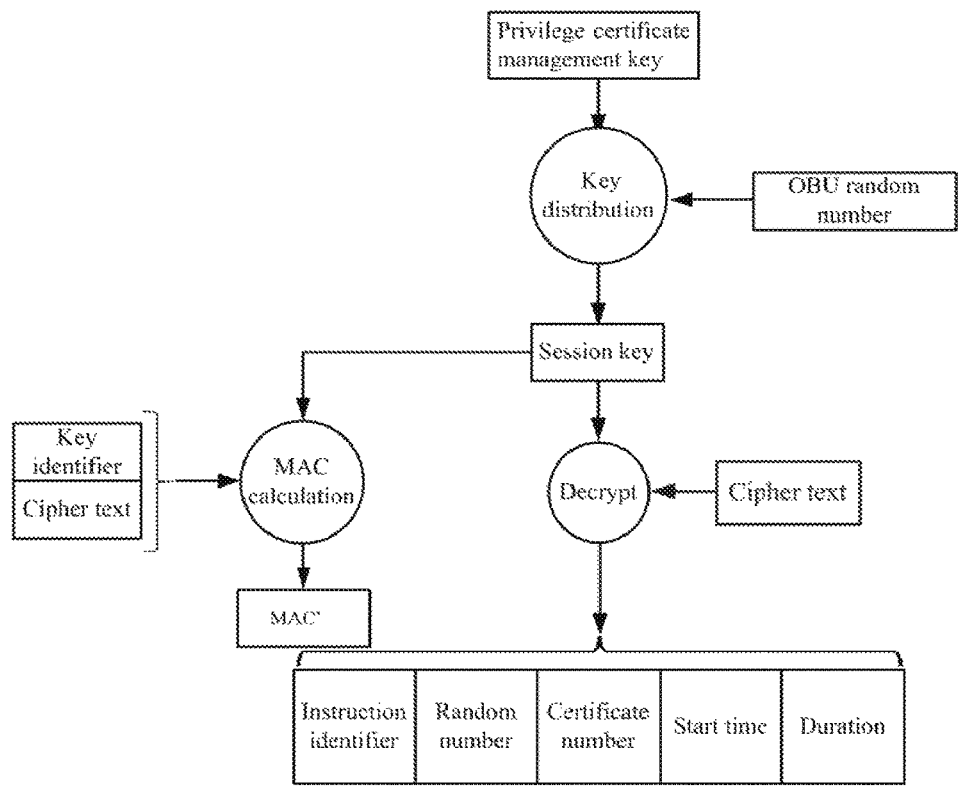
FIG. 6 is a schematic diagram of a process of authenticating and decrypting a received application control instruction by the OBU according to an embodiment of the invention.

Here the OBU authenticates and decrypts the received application control instruction as illustrated in FIG. 6 particularly as follows.

The OBU selects the corresponding privilege certificate management key according to the version number of the privilege certificate management key carried in the application control instruction;

The OBU performs key diversification on the random number carried in the application grant request instruction (i.e., the random number generated by the OBU) using the selected privilege certificate management key to generate a session key;

The OBU calculates an MAC from the version number of the privilege certificate management key, and a cipher text, in the application control instruction using the generated session key;

The OBU decrypts the cipher text in the application control instruction using the generated session key to obtain the instruction identifier identifying the type of the current instruction, the random number, the number of the specified privilege certificate, and the determined valid time, upon determining that the calculated MAC is the same as an MAC carried in the application control instruction;

The OBU stores the obtained number of the specified privilege certificate, and determined valid time upon determining that the random number carried in the application control instruction is the same as the random number carried in the application grant request instruction (i.e., the random number generated by the OBU itself).

In the process above, if the OBU determines that the calculated MAC is the same as the MAC carried in the application control instruction, then this will indicate that the application control instruction is not tempered with while being transmitted; and if the OBU determines that the calculated MAC is not the same as the MAC carried in the application control instruction, then this will indicate that the application control instruction is tempered with while being transmitted, and the flow will be terminated.

In the process above, if the OBU determines that the random number carried in the application control instruction is the same as the random number carried in the application grant request instruction, then it will indicate that the instruction is generated by the BCC; and if the OBU determines that the random number carried in the application control instruction is not the same as the random number carried in the application grant request instruction, then it will indicate that the instruction is not generated by the BCC, and the flow will be terminated.

In an implementation, before the OBU sends the application grant request instruction to the BCC, the method further includes:

The OBU receives and stores the at least one privilege certificate management key sent by the BCC.

It shall be noted that the BCC firstly performs key diversification using its master key and the identifier of the OBU (OBU ID) to obtain the at least one privilege certificate management key (OBU key) corresponding to the OBU before requesting for the privilege certificate for the OBU, that is. OBU keys of different OBUs are different from each other, and each OBU can also have a number of OBU keys, where the OBU keys corresponding to each OBU are identified by their numbers, and the BCC decides on particularly which one of the OBU keys is to be applied.

In an embodiment of the invention, before the privilege certificate is granted for authorization, the method further includes a process of requesting for the privilege certificate, and particularly, before the OBU sends the certificate application grant request instruction to the BCC, the method further includes:

The OBU sends a privilege certificate request instruction to the BCC, where the privilege certificate request instruction requests for writing the privilege certificate requested by the BCC into the OBU; and The OBU receives and stores a write control instruction sent by the BCC, where the write control instruction carries the privilege certificate requested by the BCC for the OBU, and the key pair generated by the BCC for the privilege certificate.

In the process above, the privilege certificate request instruction includes an instruction identifier identifying the type of the current instruction, the OBU identifier identifying the OBU uniquely, and the random number generated by the OBU.

Particularly the privilege certificate request instruction includes [CMD, OBU ID, OBU Random], where the CMD is the instruction identifier identifying the current instruction as the privilege certificate request instruction.

In the process above, the write control instruction generated by the BCC includes the version number of the currently used privilege certificate management key, an instruction identifier identifying the type of the current instruction, the random number carried in the privilege certificate request instruction, the requested privilege certificate, the certificate number defined by the BCC for the privilege certificate, the key pair generated by the BCC for the privilege certificate, and a time identifier identifying the valid time of the privilege certificate, where the time identifier includes the identifier of the start time at which the privilege certificate is valid, and the identifier of the validity length of time of the privilege certificate.

Particularly the write control instruction includes [OBU Key Version, CMD, OBU Random, Certificate Number, Certificate, Key Pair, Start Time, Duration], where the CMD is the instruction identifier identifying the current instruction as the write control instruction, and the Certificate Number is an internal number used between the BCC and the OBU to identify the privilege certificate issued by the CA.

It shall be noted that the valid time in which the privilege certificate can be applied can be represented in another representation in addition to the representation above, for example, the start time and the end time at which the privilege certificate is valid represent the valid time in which the privilege certificate can be applied.

In an implementation, in order to secure data transmission, the OBU authenticates and decrypts the received write control instruction to obtain and store the information included in the write control instruction.

Figure 7:
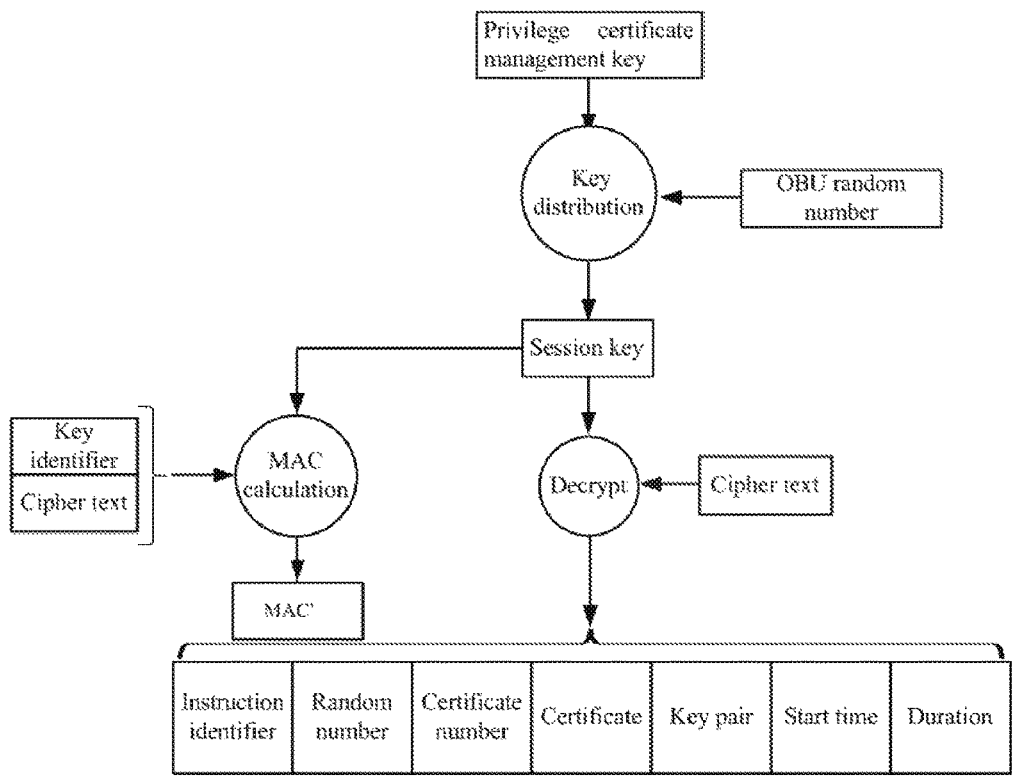
FIG. 7 is a schematic diagram of a process of authenticating and decrypting a write control instruction by the OBU according to an embodiment of the invention.

Here the OBU authenticates and decrypts the received write control instruction as illustrated in FIG. 7 particularly as follows.

The OBU selects the corresponding privilege certificate management key according to the version number of the privilege certificate management key carried in the write control instruction.

The OBU performs key diversification on the random number carried in the privilege certificate request instruction using the selected privilege certificate management key to generate a session key.

The OBU calculates an MAC from the version number of the privilege certificate management key, and a cipher text, in the write control instruction using the generated session key.

The OBU decrypts the cipher text in the write control instruction using the generated session key to obtain the instruction identifier identifying the type of the current instruction, the random number, the privilege certificate requested by the BCC for the OBU, the certificate number defined by the BCC for the privilege certificate, the key pair generated by the BCC for the privilege certificate, and the time identifier identifying the valid time of the privilege certificate, upon determining that the calculated MAC is the same as an MAC carried in the write control instruction.

The OBU stores the obtained privilege certificate, number of the privilege certificate, and key pair and time identifier corresponding to the privilege certificate upon determining that the random number carried in the write control instruction is the same as the random number carried in the privilege certificate request instruction sent by the OBU (i.e., the random number generated by the OBU itself).

Since the OBU authenticates and decrypts the write control instruction in the process above which is similar to the process in which the OBU authenticates and decrypts the received application control instruction, a repeated description thereof will be omitted here.

In an implementation, the OBU sends the privilege certificate request instruction to the BCC upon reception of a notification message sent by the BCC to notify the OBU that the BCC has requested for the privilege certificate of the OBU In an implementation, before the OBU sends the application grant request instruction to the BCC, the method further includes: the OBU receives and stores the at least one privilege certificate management key sent by the BCC.

The interaction processes between the respective entities in the method for obtaining a message certificate in an internet of vehicles system according to the invention will be described below in details with reference to a particular embodiment thereof.

In a first embodiment, 3DES-ECB is adopted as data encryption and key diversification algorithms, and 3DEC-CBC is adopted as an algorithm for calculating an MAC. Of course, the embodiment of the invention will not be limited to the algorithm for encryption, and other algorithm algorithms and MAC algorithms can also be applicable thereto, e.g., the Advanced Encryption Standard (AES) encryption algorithms, or the other MAC algorithms introduced in ISO/IEC 9797 defined by the International Standardization Organization (ISO) and the International Electronic Electrotechnical Committee (IEC). In this embodiment, the value of the MAC is in four bytes (i.e., the first four bytes in the really calculated value of the MAC), but the invention will not be limited to any particular value of the MAC.

Figure 8:
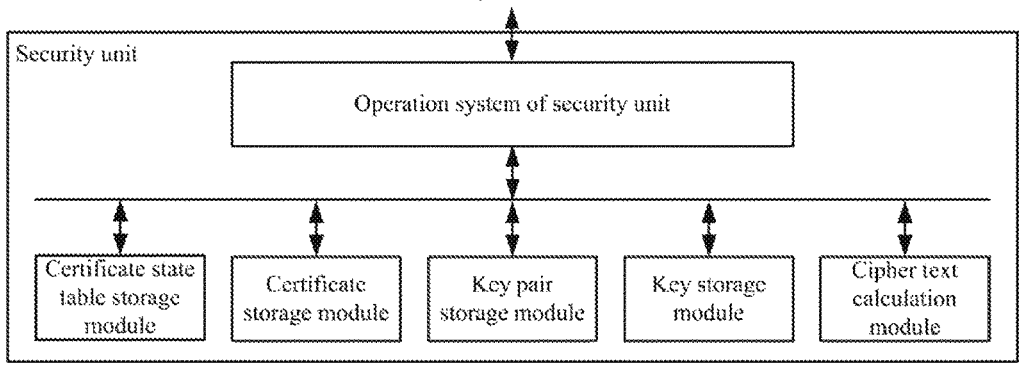
FIG. 8 is a schematic structural diagram of a security unit in the OBU according to an embodiment of the invention.

In this embodiment, the OBU includes a security unit configured to provide a trusted computing environment for a secure application of a privilege certificate, and all the operations by the OBU related to the privilege certificate are performed in the security unit. FIG. 8 illustrates a structure of the security unit of the OBU, including an operation system of the security unit, a certificate state table storage module, a certificate storage module, a key pair storage module, a key storage module, and a cipher text calculation module.

The operation system of the security unit is responsible for coordinating the respective operations in the security unit, and configured to interact with the other systems of the OBU.

The certificate state table storage module is configured to store various information related to an application of each privilege certificate.

The certificate storage module is configured to store all the privilege certificates of the OBU.

The key pair storing module is configured to store the public and private key pairs corresponding to the respective privilege certificates.

The key storage module is configured to storage symmetric keys for performing respective encryption and decryption functions.

The cipher text calculation module is configured to perform various encryption and decryption operations, and to generate a random number, in the security unit.

Data and instructions involved in this embodiment will be described below.

1. Related Data Include:

A master key of the BCC: Master Key=1F1F1F1F1F1F1F1F1F1F1F1F1F1F1F1F (in a hexadecimal representation including 16 bytes in total);

The identifier of the OBU: OBU ID=3131313131313131 (in a hexadecimal representation including 8 bytes in total, which can be represented as the string of characters 11111111);

A diversification factor of an OBU key: OBU Key Salt=OBU ID+Invert (OBU ID)

An OBU key: OBU Key=6317571AE3F9827DC96AD0B57690235C (in a hexadecimal representation including 16 bytes in total);

A key version: Key Version=31 (in a hexadecimal representation including 1 byte, which can be represented as the character 1); and A certificate number: Certificate Number=32 (in a hexadecimal representation including 1 byte, which can be represented as the string of characters 2).

2. Relate Instruction Identifiers Include:

A certificate and key pair request instruction identifier: CMD=31 (in a hexadecimal representation including 1 byte, which can be represented as the string of characters 1);

A certificate and key pair response instruction identifier: CMD=32 (in a hexadecimal representation including 1 byte, which can be represented as the string of characters 2);

A certificate application grant request instruction identifier: CMD=33 (in a hexadecimal representation including 1 byte, which can be represented as the string of characters 3); and A certificate application grant response instruction identifier: CMD=34 (in a hexadecimal representation including 1 byte, which can be represented as the string of characters 4).

3. Random Numbers Generated by the OBU Include:
OBU Random1=3232323232323232 (in a hexadecimal representation including 8 bytes, which can be represented as the string of characters 22222222); and
OBU Random2=3333333333333333 (in a hexadecimal representation including 8 bytes, which can be represented as the string of characters 33333333).

4. The Valid Time of the Privilege Certificate Includes:
Start Time=0309060845 (represented as a BCD code, where each digit occupies 4 bits, thus resulting in 5 bytes in total); and
Duration=00FF (in a hexadecimal representation including 8 bytes).

Figure 9:
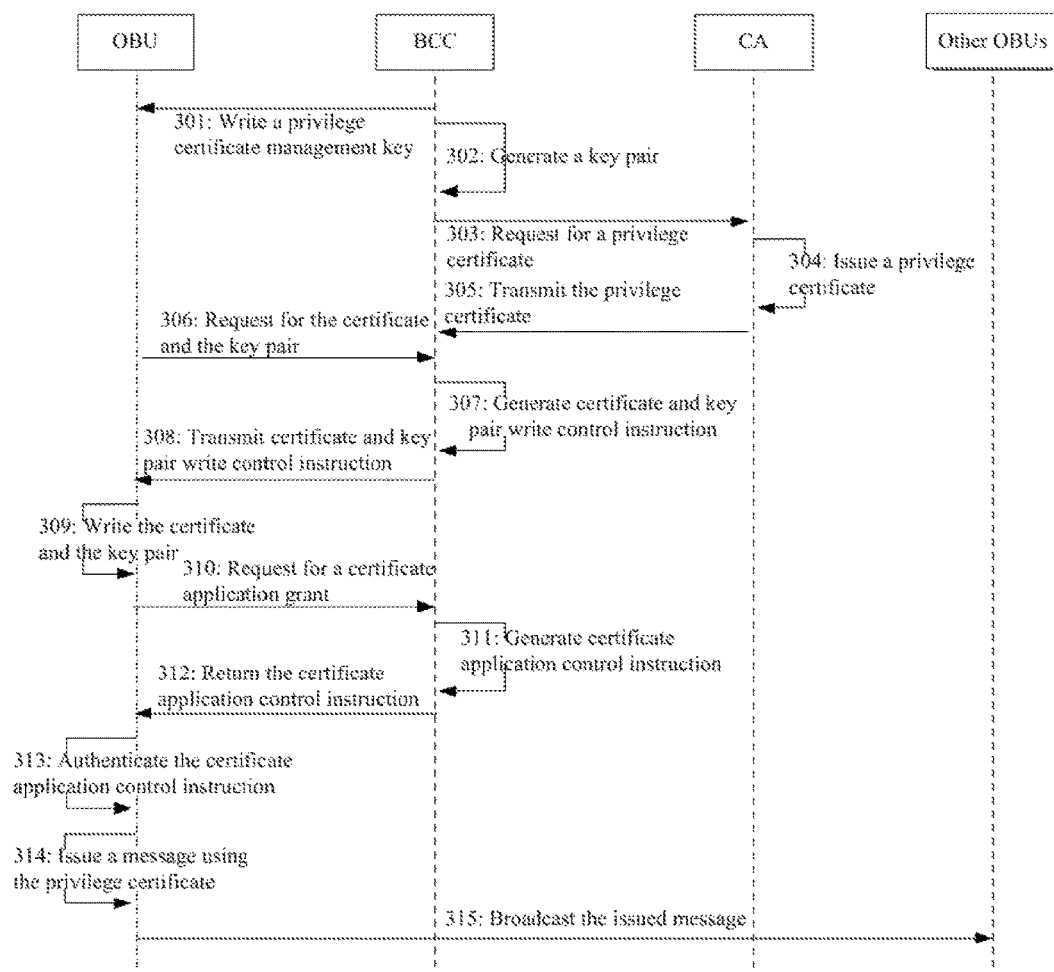
FIG. 9 is a schematic flow chart according to an embodiment of the invention.

Referring to FIG. 9, the interaction processes between the BCC and the CA, and between the BCC and the OBU in this embodiment are as follows.

In the step 301, the BCC performs 3DES calculation on the ID of the OBU using the master key possessed by the BCC to obtain the privilege certificate management key (OBU key) of the OBU, and writes the OBU key into the OBU.

Here the key diversification factor used in the 3DES calculation is "OBU ID+Invert (OBU ID)".

The calculated OBU key is: OBU Key=6317571AE3F9827DC96AD0B57690235C.

Particularly after the OBU key is generated, the BCC writes the OBU key into the key storage module in the security unit of the OBU in a secure environment, and specifies the version of the key as 01 (in a hexadecimal representation including 1 byte).

In the step 302, the BCC generates a key pair including a public key and a private key, and generates a message certificate request using the related information of the OBU.

In the step 303, the BCC sends the privilege certificate request to the CA.

In the step 304, the CA reviews the message certificate request, and then issues the corresponding privilege certificate, the sequence number of which is 12345678 (which can be displayed as a string of characters).

In the step 305, the CA transmits the issued privilege certificate to the BCC, and the BCC numbers the privilege certificate as 32 (in a hexadecimal representation).

In the step 306, the OBU sends a certificate and key pair request to the BCC, where the requests include: [CMD, OBU ID, OBU Random];
Where CMD=31;
OBU ID=3131313131313131; and
OBU Random=3232323232323232.

In the step 307, the BCC generates a certificate and key pair write control instruction generally including [CMD, Random, Certificate Number, Certificate, Key Pair, Start Time, Duration].
Where CMD=32;
Random=3232323232323232;
Certificate Number=02;
Certificate Serial Number=3132333435363738;
Key Pair=(Private Key, Public Key);
Start Time=0000000000; and
Duration=0000.

Figure 10:
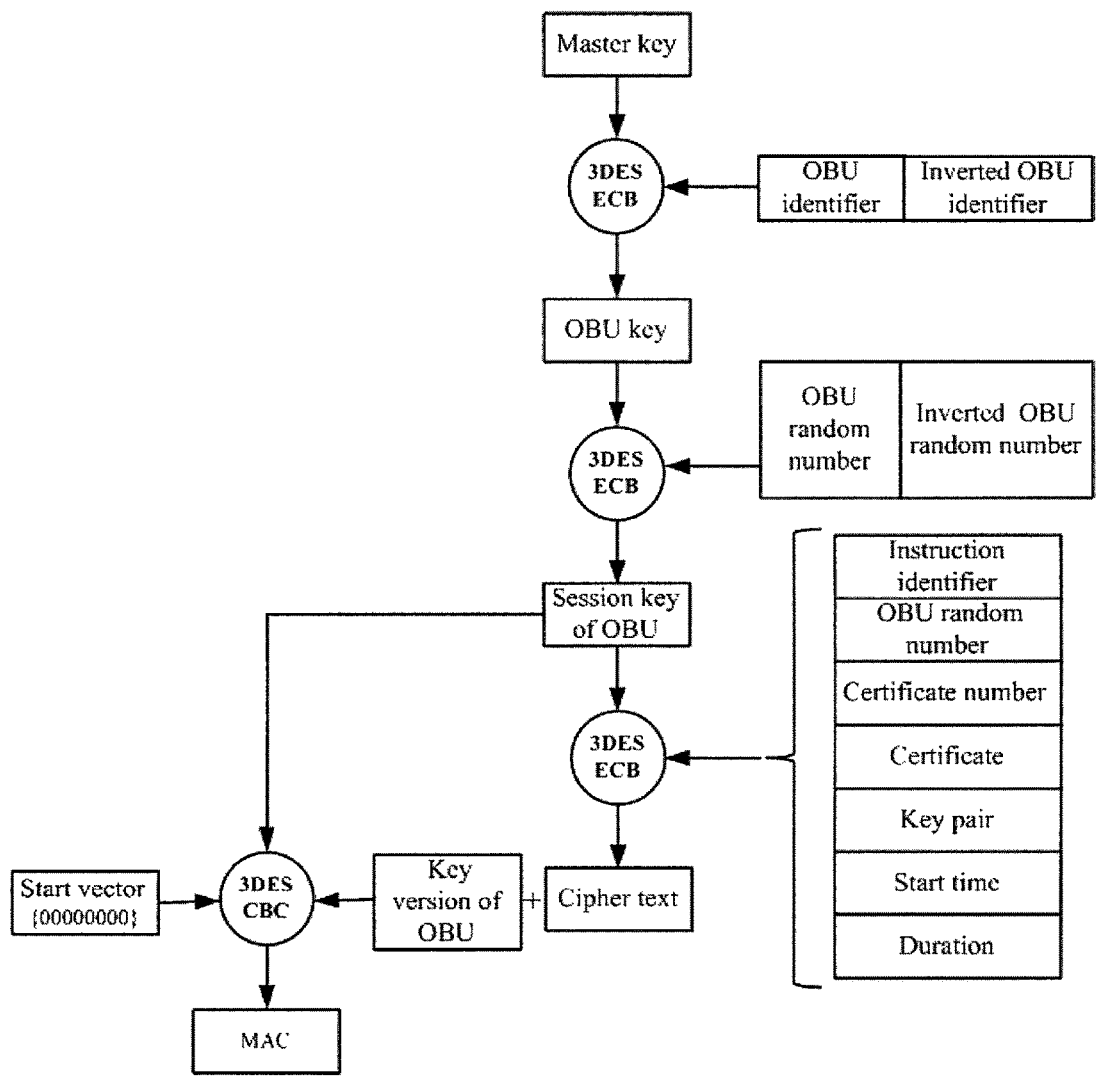
FIG. 10 is a schematic diagram of a process of encrypting information included in a generated write control instruction by the BCC according to an embodiment of the invention.

In this step, the control instruction is encrypted as illustrated in FIG. 10. Furthermore the BCC sends to the OBU a cipher text instruction including OBU Key Version+Cipher Text+MAC.
Where OBU Key Version=01.

In the step 308, the BCC sends the certificate and key pair write control instruction to the OBU.

Figure 11:
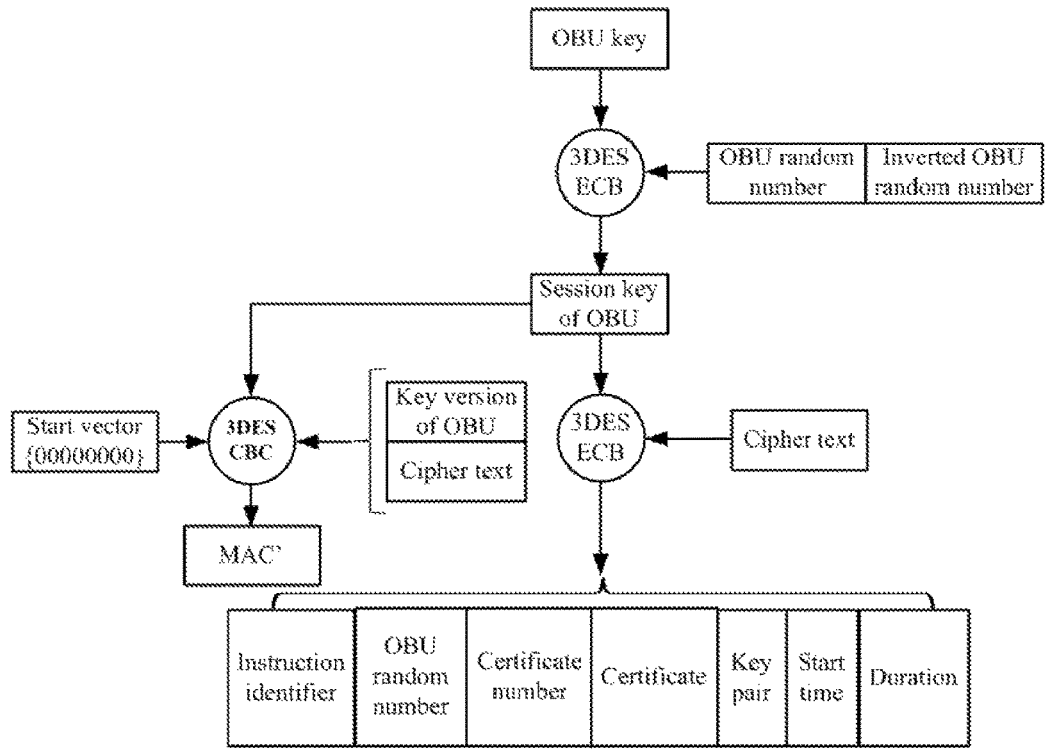
FIG. 11 is a schematic diagram of a process of authenticating and decrypting the write control instruction by the OBU according to an embodiment of the invention.

In the step 309, the OBU receives the certificate and key pair write control instruction, and then authenticates and decrypts the received data (particularly as illustrated in FIG. 11). The OBU writes the various data respectively into the certificate state table storage module, the certificate storage module, and the key pair storage module after authenticating and decrypting the data correctly.

In this step, the certificate state table after the certificate and key pair write control instruction is executed is as depicted in Table 1.

TABLE 1

| Certificate number | Certificate sequence number | Key pair address | Valid start time | Validity length of time |
|---|---|---|---|---|
| ... | ... | ... | ... | ... |
| 02 | 12345678 | 0015 | 0000000000 | 0000 |

For example, a user of the OBU has a serious patient to be delivered to a hospital, and calls the 122 alarm service station for help to request for a higher pass priority. The 122 alarm service station give the vehicle (OBU) the higher pass priority after necessarily checking the information or storing the personal/vehicle/phone number information. In this embodiment, for example, while the accident is occurring, the OBU can not automatically request for being authorized, over a wireless data link, but needs to be authorized by phone. Data involved in manually requesting by phone will be the same as the data involved in automatically requesting over a wireless network.

In the step 310, the user selects a manual request for authorization via a control interface of the OBU; and the OBU displays a certificate application grant request on a screen. The certificate application grant request includes [CMD, OBU ID, OBU Random], where:
CMD=3 (which can be displayed as a string of characters);
OBU ID=11111111 (which can be displayed as a string of characters); and
OBU Random=33333333 (which can be displayed as a string of characters).

In this embodiment, the user notifies by phone the 122 alarm service station about the reported information=3+11111111+33333333.

In the step 311, a human operator at the 122 alarm service station inputs the strings of digits provided by the user into the BCC; and the BCC generates a certificate application control instruction (calculated similarly to the encryption process as illustrated in FIG. 10). The control instruction generally includes:
[CMD, Random, Certificate Number, Start Time, Duration];
Where CMD=3 (which can be displayed as a string of characters);
Random=33333333 (which can be displayed as a string of characters);
Certificate Number=2 (which can be displayed as a string of characters);
Start Time=0309060845 (which can be displayed as a string of characters); and
Duration=00FF (which can be displayed as a string of characters, which unit is minute).

In this step, an OBU key is obtained as a result of key diversification calculation: OBU Key=6317571AE3F9827DC96AD0B57690235C.

A session key is obtained as a result of key diversification calculation: Session Key=93CDD9BC8B89F9F31132F39C32B252FF.

A plain text to be encrypted is: Plain Text=3333333333333333332030906084500FF.

A cipher text as a result of encryption is: Cipher text=04142E0A592ADD00F6CA3E95A792F0E3.

An MAC is calculated: inputs to MAC calculation=31 (Key ID)+Cipher text, and MAC value=6446D536.

In this step, the control instruction is encrypted, and the MAC is calculated, and then the following cipher text instruction is sent to the OBU:

1 (Key ID)+04142E0A592ADD00F6CA3E95A792F0E3 (Cipher Text)+6446D536 (MAC value); and The length of a generated string of characters for the instruction is 41 bytes.

In the step 312, the human operator at the 122 alarm service station notifies the user about the certificate application control instruction generated by the BCC, and the user inputs the instruction into the OBU.

In the step 313, the OBU verifies the received certificate application control instruction, and then authenticates and decrypts the received data (which are calculated similarly to the authentication and decryption process as illustrated in FIG. 11). The OBU writes the respective data into the corresponding fields recorded respectively in the certificate state table after authenticating and decrypting the data correctly.

In this step, the certificate state table after the certificate application control instruction is executed is as depicted in Table 2.

TABLE 2

| Certificate number | Certificate sequence number | Key pair address | Valid start time | Validity length of time |
|---|---|---|---|---|
| ... | ... | ... | ... | ... |
| 02 | 12345678 | 0015 | 0309060845 | 00FF |

In the step 314, the OBU signs a message using the privilege certificate in the valid time of the privilege certificate.

In the step 315, the OBU broadcasts the signed message to the other OBUs to thereby obtain the priority pass privilege.

The processing flows of the methods above can be executed in software program which can be stored in a storage medium, where the stored software program can perform the steps of the methods above upon being invoked.

Based upon the same inventive concept, an embodiment of the invention further provides a BCC, and since the BCC addresses the problem under a principle similar to the method above for obtaining a message certificate at the BCC side in an internet of vehicles, reference can be made to the implementation of the method for an implementation of the BCC, so a repeated description thereof will be omitted here.

Figure 12:
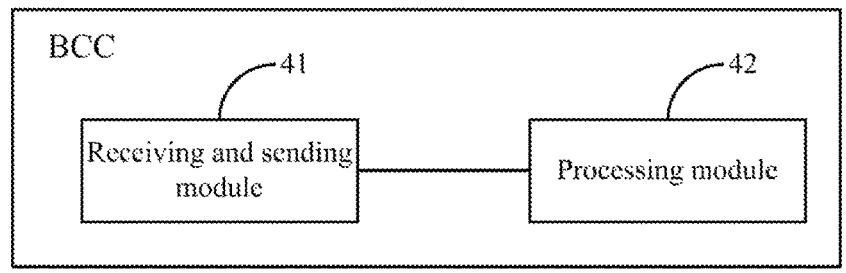
FIG. 12 is a schematic diagram of a BCC according to an embodiment of the invention.

Referring to FIG. 12, a BCC according to an embodiment of the invention includes a receiving and sending module 41, and a processing module 42.

The receiving and sending module 41 is configured to receive an application grant request instruction sent by an OBU, where the application grant request instruction requests the BCC for applying a privilege certificate written in the OBU.

The processing module 42 is configured to determine a valid time in which the OBU applies the specified privilege certificate, to generate an application control instruction according to the valid time, and to send the generated application control instruction to the OBU, where the application control instruction instructs the OBU to apply the specified privilege certificate in the valid time.

In an embodiment of the invention, the application grant request instruction includes an instruction identifier identifying the type of the current instruction, an OBU identifier (ID) identifying the OBU uniquely, and a random number (Random) generated by the OBU.

Particularly the application grant request instruction includes [CMD, OBU ID, OBU Random], where the CMD is the instruction identifier identifying the current instruction as the application grant request instruction.

In an embodiment of the invention, the application control instruction includes: a version number of a currently applied privilege certificate management key (OBU Key Version), an instruction identifier identifying the current instruction, the random number carried in the application grant request instruction, a certificate number (Certificate Number) of the currently applied privilege certificate, and the valid time.

Particularly the application control instruction includes [OBU Key Version, CMD, OBU Random, Certificate Number, Start Time, Duration], where the CMD is the instruction identifier identifying the current instruction as the application control instruction, the Certificate Number is an internal number used between the BCC and the OBU to identify the privilege certificate issued by the CA; and the Start Time and the Duration represent the valid time, where the Start Time represents a start time at which the privilege certificate is valid, and the Duration represents the length of time for which the privilege certificate is valid.

In an implementation, the receiving and sending module 41 is configured:

to receive the application grant request instruction sent by the OBU over a data transmission link; or to receive the application grant request instruction sent by the OBU through voice transmission.

In an implementation, in order to secure data transmission, the processing module 42 is configured:

to generate the application control instruction according to the valid time, to encrypt the information included in the application control instruction, and to send the encrypted application control instruction to the OBU.

Where the processing module 42 configured to encrypt the information included in the application control instruction is configured:

to perform key diversification on the random number, generated by the OBU, carried in the application grant request instruction according to the determined privilege certificate management key (OBU Key) to generate a session key;

to encrypt the instruction identifier in the application control instruction, identifying the type of the current instruction, the random number carried in the application grant request instruction, the number of the specified privilege certificate, and the determined valid time using the generated session key to obtain a cipher text; and to calculate a Message Authentication Code (MAC) from the version number of the determined privilege certificate management key, and the obtained cipher text, using the generated session key, where the encrypted application control instruction includes the version number of the determined privilege certificate management key, the obtained cipher text, and the obtained MAC.

In an implementation, before the receiving and sending module 41 receives the certificate application grant request instruction sent by the OBU.

The processing module 42 is further configured: to generate a key pair corresponding to the privilege certificate of the OBU, where the key pair includes a public key and a private key; and to generate a privilege certificate request instruction corresponding to the OBU according to the generated public key, and the related information of the OBU.

The receiving and sending module 41 is further configured: to send the privilege certificate request instruction to a Certificate Authority (CA); and to receive and store the privilege certificate issued by the CA in response to the privilege certificate request instruction.

In an implementation, after the receiving and sending module 41 receives the privilege certificate issued by the CA, and before the receiving and sending module 41 receives the application grant request instruction sent by the OBU.

The receiving and sending module 41 is further configured: to receive the privilege certificate request instruction sent by the OBU, where the privilege certificate request instruction requests for writing the privilege certificate requested by the BCC into the OBU;

The processing module 42 is further configured: to generate and send a write control instruction to the OBU, where the write control instruction includes at least the privilege certificate requested by the BCC for the OBU, and the key pair generated by the BCC for the privilege certificate.

In an embodiment of the invention, the privilege certificate request instruction includes an instruction identifier identifying the type of the current instruction, the OBU identifier identifying the OBU uniquely, and the random number generated by the OBU.

Particularly the privilege certificate request instruction includes [CMD, OBU ID, OBU Random], where the CMD is an instruction identifier identifying the current instruction as the privilege certificate request instruction.

In an embodiment of the invention, the write control instruction includes a version number of a currently applied privilege certificate management key, an instruction identifier identifying the current instruction, the random number carried in the privilege certificate request instruction, the requested privilege certificate, a certificate number defined by the BCC for the privilege certificate, a key pair generated by the BCC for the privilege certificate, and a time identifier identifying the valid time of the privilege certificate, where the time identifier includes the identifier of a start time at which the privilege certificate is valid, and the identifier of the validity length of time of the privilege certificate.

Particularly the write control instruction includes [OBU Key Version, CMD, OBU Random, Certificate Number, Certificate, Key Pair, Start Time, Duration], where the CMD is the instruction identifier identifying the current instruction as a write control instruction, and the Certificate Number is an internal number used between the BCC and the OBU to identify the privilege certificate issued by the CA.

In an implementation, in order to secure data transmission, the processing module 42 configured to generate and send the write control instruction to the OBU is configured:

to generate the write control instruction, to encrypt the information included in the generated write control instruction, and to send the encrypted write control instruction to the OBU.

Where the processing module 42 configured to encrypt the information included in the generated write control instruction is configured:

to perform key diversification on the random number generated by the OBU, carried in the write control instruction using the determined privilege certificate management key to generate a session key; and to encrypt the instruction identifier, in the write control instruction, identifying the type of the current instruction, the random number carried in the privilege certificate request instruction, the requested privilege certificate, the certificate number defined by the BCC for the privilege certificate, the key pair generated by the BCC for the privilege certificate, and the time identifier identifying the valid time of the privilege certificate, using the generated session key to obtain a cipher text; and to calculate an MAC from the version number of the determined privilege certificate management key, and the obtained cipher text, using the generated session key, where the encrypted write control instruction includes the version number of the determined privilege certificate management key, the obtained cipher text, and the obtained MAC.

In an implementation, before the receiving and sending module 41 receives the certificate application grant request instruction sent by the OBU.

The processing module 42 is further configured: to generate at least one privilege certificate management key corresponding to the OBU according to its at least one master key, and the identifier of the OBU.

The receiving and sending module 41 is further configured: to send the at least one privilege certificate management key to the OBU.

Based upon the same inventive concept, an embodiment of the invention further provides an OBU, and since the OBU addresses the problem under a principle similar to the method above for obtaining a message certificate at the OBU side in an internet of vehicles, reference can be made to the implementation of the method for an implementation of the OBU, so a repeated description thereof will be omitted here.

Figure 13:
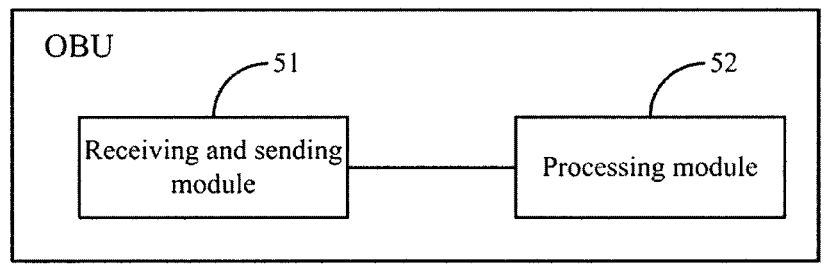
FIG. 13 is a schematic diagram of an OBU according to an embodiment of the invention.

Referring to FIG. 13, an embodiment of the invention provides an On-Board Unit (OBU) includes a receiving and sending module 51 and a processing module 52.

The receiving and sending module 51 is configured, if the OBU needs to issue a message using a privilege certificate, to send an application grant request instruction to a BCC, where the application grant request instruction requests the BCC for applying the privilege certificate written in the OBU; and to receive an application control instruction sent by the BCC.

The processing module 52 is configured to issue the message using the privilege certificate specified by the BCC in a valid time specified by the BCC according to the application control instruction, and to broadcast the issued message to the other OBUs than the OBU.

In an embodiment of the invention, the application grant request instruction includes an instruction identifier identifying the type of the current instruction, an OBU ID identifying the OBU uniquely, and a random number (Random) generated by the OBU.

Particularly the application grant request instruction includes [CMD, OBU ID, OBU Random], where the CMD is the instruction identifier identifying the current instruction as the application grant request instruction.

In an embodiment of the invention, the application control instruction includes: a version number of a currently applied privilege certificate management key (OBU Key Version), an instruction identifier identifying the current instruction, the random number carried in the application grant request instruction, a certificate number (Certificate Number) of the currently applied privilege certificate, and the valid time.

Particularly the application control instruction includes [OBU Key Version, CMD, OBU Random, Certificate Number, Start Time, Duration], where the CMD is the instruction identifier identifying the current instruction as the application control instruction, the Certificate Number is an internal number used between the BCC and the OBU to identify the privilege certificate issued by a CA; and the Start Time and the Duration represent the valid time, where the Start Time represents a start time at which the privilege certificate is valid, and the Duration represents the length of time for which the privilege certificate is valid.

In an implementation, the receiving and sending module 51 is configured:

to send the application grant request instruction to the BCC over a data transmission link; or to send the application grant request instruction to the BCC through voice transmission.

In an implementation, after the receiving and sending module 51 receives the application control instruction sent by the BCC, the processing module 52 is further configured:

to authenticate and decrypt the application control instruction to obtain and store the information included in the application control instruction.

Where the processing module 52 configured to authenticate and decrypt the application control instruction is configured:

to select the corresponding privilege certificate management key according to the version number of the privilege certificate management key carried in the application control instruction;

to perform key diversification on the random number carried in the application grant request instruction using the selected privilege certificate management key to generate a session key;

to calculate an MAC from the version number of the privilege certificate management key, and a cipher text, in the application control instruction using the generated session key;

to decrypt the cipher text in the application control instruction using the generated session key to obtain the instruction identifier identifying the type of the current instruction, the random number, the number of the specified privilege certificate, and the determined valid time, upon determining that the calculated MAC is the same as an MAC carried in the application control instruction; and to store the obtained number of the specified privilege certificate, and determined valid time upon determining that the random number carried in the application control instruction is the same as the random number carried in the application grant request instruction.

In an implementation, before the receiving and sending module 51 sends the application grant request instruction to the BCC.

The receiving and sending module 51 is further configured: to send a privilege certificate request instruction to the BCC, where the privilege certificate request instruction requests for writing the privilege certificate requested by the BCC into the OBU; and to receive a write control instruction sent by the BCC.

The processing module 52 is further configured: to store the privilege certificate requested by the BCC for the OBU, and a key pair generated by the BCC for the privilege certificate, carried in the write control instruction.

In an embodiment of the invention, the privilege certificate request instruction includes an instruction identifier identifying the type of the current instruction, the OBU identifier identifying the OBU uniquely, and the random number generated by the OBU.

Particularly the privilege certificate request instruction includes [CMD, OBU ID, OBU Random], where the CMD is the instruction identifier identifying the current instruction as the privilege certificate request instruction.

In an embodiment of the invention, the write control instruction includes the version number of the currently used privilege certificate management key, an instruction identifier identifying the type of the current instruction, the random number carried in the privilege certificate request instruction, the requested privilege certificate, the certificate number defined by the BCC for the privilege certificate, the key pair generated by the BCC for the privilege certificate, and a time identifier identifying the valid time of the privilege certificate, where the time identifier includes the identifier of the start time at which the privilege certificate is valid, and the identifier of the validity length of time of the privilege certificate.

Particularly the write control instruction includes [OBU Key Version, CMD, OBU Random, Certificate Number, Certificate, Key Pair, Start Time, Duration], where the CMD is the instruction identifier identifying the current instruction as the write control instruction, and the Certificate Number is an internal number used between the BCC and the OBU to identify the privilege certificate issued by the CA.

In an implementation, after the receiving and sending module 51 receives the write control instruction sent by the BCC, the processing module 52 is further configured:

to authenticate and decrypt the write control instruction to obtain and store the information included in the write control instruction.

Where the processing module 52 configured to authenticate and decrypt the write control instruction is configured:

to select the corresponding privilege certificate management key according to the version number of the privilege certificate management key carried in the write control instruction;

to perform key diversification on the random number carried in the privilege certificate request instruction using the selected privilege certificate management key to generate a session key;

to calculate an MAC from the version number of the privilege certificate management key, and a cipher text, in the write control instruction using the generated session key;

to decrypt the cipher text in the write control instruction using the generated session key to obtain the instruction identifier identifying the type of the current instruction, the random number, the privilege certificate requested by the BCC for the OBU, the certificate number defined by the BCC for the privilege certificate, the key pair generated by the BCC for the privilege certificate, and the time identifier identifying the valid time of the privilege certificate, upon determining that the calculated MAC is the same as an MAC carried in the write control instruction; and to store the obtained privilege certificate, number of the privilege certificate, and key pair and time identifier corresponding to the privilege certificate upon determining that the random number carried in the write control instruction is the same as the random number carried in the privilege certificate request instruction sent by the OBU.

Further to any one of the embodiments above, the receiving and sending module 51 is further configured, before the application grant request instruction is sent to the BCC, to:

receive and store at least one privilege certificate management key sent by the BCC.

A structure of and processing by a BCC according to an embodiment of the invention will be described below in connection with a preferred hardware structure thereof.

Figure 14:
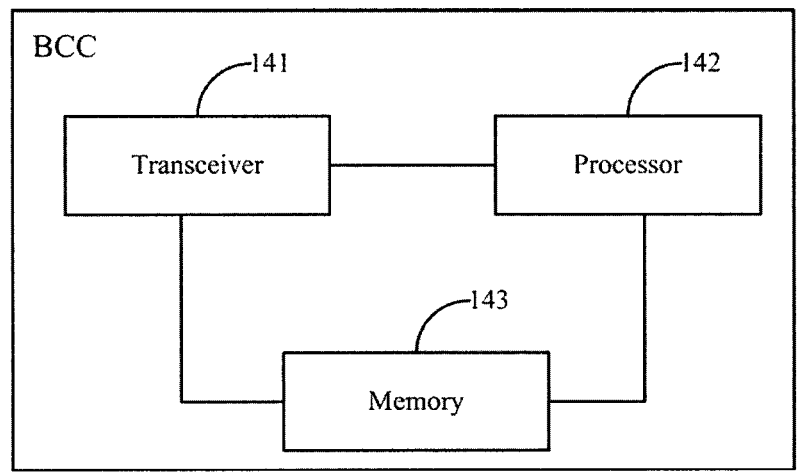
FIG. 14 is a schematic structural diagram of another BCC according to an embodiment of the invention.

Referring to FIG. 14, the BCC includes a transceiver 141, at least one processor 142 connected with the transceiver 141, and a memory 143 connected respectively with the transceiver 141 and the processor 142.

The transceiver 141 is configured to receive an application grant request instruction sent by an OBU, where the application grant request instruction requests the BCC for applying a privilege certificate written in the OBU;

The processor 142 is configured to determine a valid time in which the OBU applies the specified privilege certificate, to generate an application control instruction according to the valid time, and to trigger the transceiver to send the generated application control instruction to the OBU, where the application control instruction instructs the OBU to apply the specified privilege certificate in the valid time.

In an embodiment of the invention, the application grant request instruction includes an instruction identifier identifying the type of the current instruction, an OBU identifier (ID) identifying the OBU uniquely, and a random number (Random) generated by the OBU.

Particularly the application grant request instruction includes [CMD, OBU ID, OBU Random], where the CMD is the instruction identifier identifying the current instruction as the application grant request instruction.

In an embodiment of the invention, the application control instruction includes: a version number of a currently applied privilege certificate management key (OBU Key Version), an instruction identifier identifying the current instruction, the random number carried in the application grant request instruction, a certificate number (Certificate Number) of the currently applied privilege certificate, and the valid time.

Particularly the application control instruction includes [OBU Key Version, CMD, OBU Random, Certificate Number, Start Time, Duration], where the CMD is the instruction identifier identifying the current instruction as the application control instruction, the Certificate Number is an internal number used between the BCC and the OBU to identify the privilege certificate issued by the CA; and the Start Time and the Duration represent the valid time, where the Start Time represents a start time at which the privilege certificate is valid, and the Duration represents the length of time for which the privilege certificate is valid.

In an implementation, the transceiver 141 is configured:

to receive the application grant request instruction sent by the OBU over a data transmission link; or to receive the application grant request instruction sent by the OBU through voice transmission.

In an implementation, in order to secure data transmission, the processor 142 is configured:

to generate the application control instruction according to the valid time, to encrypt the information included in the application control instruction, and to send the encrypted application control instruction to the OBU.

Where the processor 142 configured to encrypt the information included in the application control instruction is configured:

to perform key diversification on the random number, generated by the OBU, carried in the application grant request instruction according to the determined privilege certificate management key (OBU Key) to generate a session key;

to encrypt the instruction identifier, in the application control instruction, identifying the type of the current instruction, the random number carried in the application grant request instruction, the number of the specified privilege certificate, and the determined valid time, using the generated session key to obtain a cipher text; and to calculate a Message Authentication Code (MAC) from the version number of the determined privilege certificate management key, and the obtained cipher text, using the generated session key, where the encrypted application control instruction includes the version number of the determined privilege certificate management key, the obtained cipher text, and the obtained MAC.

In an implementation, before the transceiver 141 receives the certificate application grant request instruction sent by the OBU.

The processor 142 is further configured: to generate a key pair corresponding to the privilege certificate of the OBU, where the key pair includes a public key and a private key; and to generate a privilege certificate request instruction corresponding to the OBU according to the generated public key, and the related information of the OBU.

The transceiver 141 is further configured: to send the privilege certificate request instruction to a CA; and to receive the privilege certificate issued by the CA in response to the privilege certificate request instruction.

The memory 143 is configured: to store the privilege certificate issued by the CA, and the key pair corresponding to the privilege certificate, generated by the processor 142.

In an implementation, after the transceiver 141 receives the privilege certificate issued by the CA, and before the transceiver 141 receives the application grant request instruction sent by the OBU.

The transceiver 141 is further configured: to receive the privilege certificate request instruction sent by the OBU, where the privilege certificate request instruction requests for writing the privilege certificate requested by the BCC into the OBU.

The processor 142 is further configured: to generate a write control instruction, and to trigger the transceiver 141 to send the write control instruction to the OBU, where the write control instruction includes at least the privilege certificate requested by the BCC for the OBU, and the key pair generated by the BCC for the privilege certificate.

In an embodiment of the invention, the privilege certificate request instruction includes an instruction identifier identifying the type of the current instruction, the OBU identifier identifying the OBU uniquely, and the random number generated by the OBU.

Particularly the privilege certificate request instruction includes [CMD, OBU ID, OBU Random], where the CMD is an instruction identifier identifying the current instruction as the privilege certificate request instruction.

In an embodiment of the invention, the write control instruction includes a version number of a currently applied privilege certificate management key, an instruction identifier identifying the current instruction, the random number carried in the privilege certificate request instruction, the requested privilege certificate, a certificate number defined by the BCC for the privilege certificate, a key pair generated by the BCC for the privilege certificate, and a time identifier identifying the valid time of the privilege certificate, where the time identifier includes the identifier of a start time at which the privilege certificate is valid, and the identifier of the validity length of time of the privilege certificate.

Particularly the write control instruction includes [OBU Key Version, CMD, OBU Random, Certificate Number, Certificate, Key Pair, Start Time, Duration], where the CMD is the instruction identifier identifying the current instruction as a write control instruction, and the Certificate Number is an internal number used between the BCC and the OBU to identify the privilege certificate issued by the CA.

In an implementation, in order to secure data transmission, the processor 142 configured to generate and send the write control instruction to the OBU is configured:

to generate the write control instruction, to encrypt the information included in the generated write control instruction, and to send the encrypted write control instruction to the OBU.

Where the processor 142 configured to encrypt the information included in the generated write control instruction is configured:

to perform key diversification on the random number generated by the OBU, carried in the write control instruction using the determined privilege certificate management key to generate a session key; and to encrypt the instruction identifier, in the write control instruction, identifying the type of the current instruction, the random number carried in the privilege certificate request instruction, the requested privilege certificate, the certificate number defined by the BCC for the privilege certificate, the key pair generated by the BCC for the privilege certificate, and the time identifier identifying the valid time of the privilege certificate, using the generated session key to obtain a cipher text; and to calculate an MAC from the version number of the determined privilege certificate management key, and the obtained cipher text, using the generated session key, where the encrypted write control instruction includes the version number of the determined privilege certificate management key, the obtained cipher text, and the obtained MAC.

In an implementation, before the transceiver 141 receives the certificate application grant request instruction sent by the OBU.

The processor 142 is further configured: to generate at least one privilege certificate management key corresponding to the OBU according to at least one master key stored in the memory 143, and the identifier of the OBU, and to store the at least one privilege certificate management key in the memory 143.

The transceiver 141 is further configured: to send the at least one privilege certificate management key to the OBU.

A structure of and processing by an OBU according to an embodiment of the invention will be described below in connection with a preferred hardware structure thereof.

Figure 15:
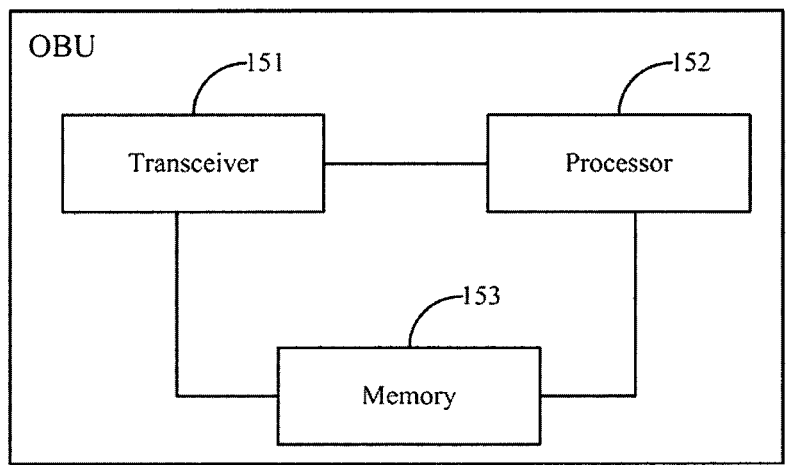
FIG. 15 is a schematic structural diagram of another OBU according to an embodiment of the invention.

Referring to FIG. 15, the OBU includes a transceiver 151, at least one processor 142 connected with the transceiver 151, and a memory 153 connected respectively with the transceiver 151 and the processor 152.

The transceiver 151 is configured, if the OBU needs to issue a message using a privilege certificate, to send an application grant request instruction to a BCC, where the application grant request instruction requests the BCC for applying the privilege certificate written in the OBU; and to receive an application control instruction sent by the BCC.

The processor 152 is configured to issue the message using the privilege certificate specified by the BCC in a valid time specified by the BCC according to the application control instruction, and to broadcast the issued message to the other OBUs than the OBU.

In an embodiment of the invention, the application grant request instruction includes an instruction identifier identifying the type of the current instruction, an OBU ID identifying the OBU uniquely, and a random number (Random) generated by the OBU.

Particularly the application grant request instruction includes [CMD, OBU ID, OBU Random], where the CMD is the instruction identifier identifying the current instruction as the application grant request instruction.

In an embodiment of the invention, the application control instruction includes: a version number of a currently applied privilege certificate management key (OBU Key Version), an instruction identifier identifying the current instruction, the random number carried in the application grant request instruction, a certificate number (Certificate Number) of the currently applied privilege certificate, and the valid time.

Particularly the application control instruction includes [OBU Key Version, CMD, OBU Random, Certificate Number, Start Time, Duration], where the CMD is the instruction identifier identifying the current instruction as the application control instruction, the Certificate Number is an internal number used between the BCC and the OBU to identify the privilege certificate issued by a CA; and the Start Time and the Duration represent the valid time, where the Start Time represents a start time at which the privilege certificate is valid, and the Duration represents the length of time for which the privilege certificate is valid.

In an implementation, the transceiver 151 is configured:

to send the application grant request instruction to the BCC over a data transmission link; or to send the application grant request instruction to the BCC through voice transmission.

In an implementation, after the transceiver 151 receives the application control instruction sent by the BCC, the processor 152 is further configured:

to authenticate and decrypt the application control instruction to obtain and store in the memory 153 the information included in the application control instruction.

Where the processor 152 configured to authenticate and decrypt the application control instruction is configured:

to select the corresponding privilege certificate management key according to the version number of the privilege certificate management key carried in the application control instruction;

to perform key diversification on the random number carried in the application grant request instruction using the selected privilege certificate management key to generate a session key;

to calculate an MAC from the version number of the privilege certificate management key, and a cipher text, in the application control instruction using the generated session key;

to decrypt the cipher text in the application control instruction using the generated session key to obtain the instruction identifier identifying the type of the current instruction, the random number, the number of the specified privilege certificate, and the determined valid time, upon determining that the calculated MAC is the same as an MAC carried in the application control instruction; and to store in the memory 153 the obtained number of the specified privilege certificate, and determined valid time upon determining that the random number carried in the application control instruction is the same as the random number carried in the application grant request instruction.

In an implementation, before the transceiver 151 sends the application grant request instruction to the BCC.

The transceiver 151 is further configured: to send a privilege certificate request instruction to the BCC, where the privilege certificate request instruction requests for writing the privilege certificate requested by the BCC into the OBU; and to receive a write control instruction sent by the BCC.

The processor 152 is further configured: to store in the memory 153 the privilege certificate requested by the BCC for the OBU, and a key pair generated by the BCC for the privilege certificate, carried in the write control instruction.

In an embodiment of the invention, the privilege certificate request instruction includes an instruction identifier identifying the type of the current instruction, the OBU identifier identifying the OBU uniquely, and the random number generated by the OBU.

Particularly the privilege certificate request instruction includes [CMD, OBU ID, OBU Random], where the CMD is the instruction identifier identifying the current instruction as the privilege certificate request instruction.

In an embodiment of the invention, the write control instruction includes the version number of the currently used privilege certificate management key, an instruction identifier identifying the type of the current instruction, the random number carried in the privilege certificate request instruction, the requested privilege certificate, the certificate number defined by the BCC for the privilege certificate, the key pair generated by the BCC for the privilege certificate, and a time identifier identifying the valid time of the privilege certificate, where the time identifier includes the identifier of the start time at which the privilege certificate is valid, and the identifier of the validity length of time of the privilege certificate.

Particularly the write control instruction includes [OBU Key Version, CMD, OBU Random, Certificate Number, Certificate, Key Pair, Start Time, Duration], where the CMD is the instruction identifier identifying the current instruction as the write control instruction, and the Certificate Number is an internal number used between the BCC and the OBU to identify the privilege certificate issued by the CA.

In an implementation, after the transceiver 151 receives the write control instruction sent by the BCC, the processor 152 is further configured:

to authenticate and decrypt the write control instruction to obtain and store in the memory 153 the information included in the write control instruction.

Where the processor 152 configured to authenticate and decrypt the write control instruction is configured:

to select the corresponding privilege certificate management key according to the version number of the privilege certificate management key carried in the write control instruction;

to perform key diversification on the random number carried in the privilege certificate request instruction using the selected privilege certificate management key to generate a session key;

to calculate an MAC from the version number of the privilege certificate management key, and a cipher text, in the write control instruction using the generated session key;

to decrypt the cipher text in the write control instruction using the generated session key to obtain the instruction identifier identifying the type of the current instruction, the random number, the privilege certificate requested by the BCC for the OBU, the certificate number defined by the BCC for the privilege certificate, the key pair generated by the BCC for the privilege certificate, and the time identifier identifying the valid time of the privilege certificate, upon determining that the calculated MAC is the same as an MAC carried in the write control instruction; and to store the obtained privilege certificate, number of the privilege certificate, and key pair and time identifier corresponding to the privilege certificate in the memory 153 upon determining that the random number carried in the write control instruction is the same as the random number carried in the privilege certificate request instruction sent by the OBU.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for obtaining a message certificate in an internet of vehicles system, the method comprising:

receiving, via a first data transmission link, by a Background Control Center (BCC), a first request sent by an On-Board Unit (OBU), wherein the first request requests the BCC to transmit a privilege certificate to the OBU, the privilege certificate specifying a level of privilege for movement on a road, wherein the OBU comprises a transceiver;

requesting, by the BCC, the privilege certificate from a Certificate Authority (CA);

receiving, by the BCC, the privilege certificate from the CA;

generating, by the BCC, a key pair for secure communication using the privilege certificate, the key pair including a public key and a private key;

transmitting, via the first data transmission link, by the BCC, a write control instruction to the OBU, wherein the write control instruction comprises at least the privilege certificate and the key pair;

receiving, via the first data transmission link, by the BCC, a second request sent by the OBU, wherein the second request requests the BCC to authorize the OBU to use the privilege certificate;

in response to receiving the second request, determining, by the BCC, a valid time period in which the OBU is permitted to use the privilege certificate;

generating, by the BCC, an application control instruction according to the valid time period; and transmitting, by the BCC, via the first data transmission link, the generated application control instruction to the OBU, wherein the application control instruction instructs the OBU to use the privilege certificate within the valid time period.

2. The method according to claim 1, wherein generating, by the BCC, the application control instruction according to the valid time period, and transmitting the generated application control instruction to the OBU comprises:

generating, by the BCC, the application control instruction according to the valid time period, encrypting the application control instruction, and transmitting the encrypted application control instruction to the OBU.

3. The method according to claim 2, wherein encrypting, by the BCC, the application control instruction comprises:

performing, by the BCC using a determined privilege certificate management key, key diversification on a random number to generate a session key, wherein the random number is generated by the OBU and is carried in the second request;

encrypting, by the BCC using the generated session key, an instruction identifier in the application control instruction for identifying the type of the current instruction, the random number carried in the second request, the number of the privilege certificate, and the determined valid time period to obtain a cipher text; and calculating, by the BCC using the generated session key, a version number of the determined privilege certificate management key and the obtained cipher text to obtain a Message Authentication Code (MAC), wherein the encrypted application control instruction comprises the version number of the determined privilege certificate management key, the obtained cipher text, and the obtained MAC.

4. The method according to claim 3, wherein before the BCC receives the second request sent by the OBU, the method further comprises:

generating, by the BCC according to at least one master key and an identifier of the OBU, at least one privilege certificate management key corresponding to the OBU, and transmitting the at least one privilege certificate management key to the OBU.

5. The method according to claim 1, wherein before the BCC receives the first request sent by the OBU, the method further comprises:

generating, by the BCC according to the generated public key and related information of the OBU, the first request corresponding to the OBU, transmitting, via the first data transmission link, by the BCC, the first request to the CA; and receiving and storing, by the BCC, the privilege certificate issued by the CA in response to the first request.

6. The method according to claim 1, wherein transmitting, via the first data transmission link, by the BCC, the write control instruction to the OBU comprises:

generating, by the BCC, the write control instruction, encrypting the generated write control instruction, and transmitting, via the first data transmission link, the encrypted write control instruction to the OBU.

7. The method according to claim 6, wherein encrypting, by the BCC, the generated write control instruction comprises:

performing, by the BCC using a determined privilege certificate management key, key diversification on a random number to generate a session key, wherein the random number is generated by the OBU and is carried in the write control instruction;

encrypting, by the BCC using the generated session key, an instruction identifier in the write control instruction for identifying the type of the current instruction, the random number carried in the first request, the requested privilege certificate, a certificate number defined by the BCC for the privilege certificate, the key pair generated by the BCC for the privilege certificate, and a time identifier identifying the valid time period of the privilege certificate, to obtain a cipher text; and calculating, by the BCC using the generated session key, version number of the determined privilege certificate management key and the obtained cipher text to obtain a MAC, wherein the encrypted write control instruction comprises the version number of the determined privilege certificate management key, the obtained cipher text, and the obtained MAC.

8. A method for obtaining a message certificate in an internet of vehicles system, comprising:

sending, by an On-Board Unit (OBU), first request to a Background Control Center (BCC), wherein the first request requests the BCC to transmit a privilege certificate to the OBU via a first data transmission link, the privilege certificate specifying a level of privilege for movement on a road, wherein the OBU comprises a transceiver;

requesting, by the BCC, the privilege certificate from a Certificate Authority (CA);

receiving, by the BCC, the privilege certificate from the CA;

generating, by the BCC, a key pair for secure communication using the privilege certificate, the key pair including a public key and a private key;

receiving, by the OBU, a write control instruction sent by the BCC via the first data transmission link, storing, by the OBU, the privilege certificate and the key pair carried in the write control instruction;

if the OBU needs to issue a message using the privilege certificate, then sending a second request to the BCC, wherein the second request requests the BCC to authorize the OBU to use the privilege certificate;

upon reception of an application control instruction sent by the BCC, issuing, by the OBU according to the application control instruction, the message using the privilege certificate in a valid time period specified by the BCC; and broadcasting, by the OBU, the issued message to other OBUs than the OBU.

9. The method according to claim 8, wherein after the OBU receives the application control instruction sent by the BCC, the method further comprises:

authenticating and decrypting, by the OBU, the application control instruction to obtain and store the information comprised in the application control instruction.

10. The method according to claim 9, wherein authenticating and decrypting, by the OBU, the application control instruction comprises:

selecting, by the OBU according to a version number of a privilege certificate management key carried in the application control instruction, a corresponding privilege certificate management key;

performing, by the OBU using the selected privilege certificate management key, key diversification on a random number carried in the second request to generate a session key;

calculating, by the OBU using the generated session key, the version number of the privilege certificate management key and a cipher text comprised in the application control instruction to obtain a Message Authentication Code (MAC);

decrypting, by the OBU using the generated session key and upon determining that the obtained MAC is identical to a MAC carried in the application control instruction, the cipher text comprised in the application control instruction to obtain an instruction identifier for identifying a type of the current instruction, a random number, a number of the privilege certificate, and a determined valid time period; and storing, by the OBU upon determining that the random number carried in the application control instruction is identical to the random number carried in the second request, the number of the privilege certificate and the determined valid time period.

11. The method according to claim 8, wherein after the OBU receives the write control instruction, the method comprises:

authenticating and decrypting, by the OBU, the write control instruction to obtain and store the information comprised in the write control instruction.

12. The method according to claim 11, wherein authenticating and decrypting, by the OBU, the write control instruction comprises:

selecting, by the OBU according to a version number of a privilege certificate management key carried in the write control instruction, a corresponding privilege certificate management key;

performing, by the OBU using the selected privilege certificate management key, key diversification on a random number carried in the first request to generate a session key;

calculating, by the OBU using the generated session key, the version number of the privilege certificate management key and a cipher text comprised in the write control instruction to obtain a Message Authentication Code (MAC);

decrypting, by the OBU using the generated session key and upon determining that the obtained MAC is identical to a MAC carried in the write control instruction, the cipher text comprised in the write control instruction to obtain an instruction identifier for identifying a type of the current instruction, a random number, the privilege certificate, a certificate number defined by the BCC for the privilege certificate, the key pair, and a time identifier identifying the valid time period of the privilege certificate; and storing, by the OBU upon determining that the random number carried in the write control instruction is identical to the random number carried in the second request, the privilege certificate, the number of the privilege certificate, the key pair and the time identifier.

13. An On-Board Unit (OBU), comprising:

a processor;

a transceiver;

a memory storing at least one instruction, wherein the processor is configured to execute the at least one instruction to:

send a first request to a Background Control Center (BCC), wherein the first request requests the BCC to transmit a privilege certificate to the OBU via a first data transmission link, the privilege certificate specifying a level of privilege for movement on a road;

request, by the BCC, the privilege certificate from a Certificate Authority (CA);

receive, by the BCC, the privilege certificate from the CA;

generate, by the BCC, a key pair for secure communication using the privilege certificate, the key pair including a public key and a private key;

receive a write control instruction sent by the BCC via the first data transmission link, store the privilege certificate and the key pair carried in the write control instruction;

if the OBU needs to issue a message using the privilege certificate, send a second request to a BCC, wherein the second request requests the BCC to authorize the OBU to use the privilege certificate;

receive an application control instruction sent by the BCC;

after receiving the application control instruction sent by the BCC, issue the message using the privilege certificate in a valid time period specified by the BCC according to the application control instruction; and broadcast the issued message to other OBUs than the OBU.

14. The OBU according to claim 13, wherein after receiving the application control instruction sent by the BCC, the processor is further configured to execute the at least one instruction to:

authenticate and decrypt the application control instruction to obtain and store the information comprised in the application control instruction.

15. The OBU according to claim 14, wherein the processor configured to execute the at least one instruction to authenticate and decrypt the application control instruction is configured:

according to a version number of a privilege certificate management key carried in the application control instruction, to select a corresponding privilege certificate management key;

using the selected privilege certificate management key, to perform key diversification on a random number carried in the second request to generate a session key;

using the generated session key, to calculate the version number of the privilege certificate management key and a cipher text comprised in the application control instruction to obtain a Message Authentication Code (MAC);

using the generated session key and upon determining that the obtained MAC is identical to a MAC carried in the application control instruction, to decrypt the cipher text comprised in the application control instruction to obtain an instruction identifier for identifying a type of the current instruction, a random number, a number of the privilege certificate, and a determined valid time period; and upon determining that the random number carried in the application control instruction is identical to the random number carried in the second request, to store the number of the privilege certificate and the determined valid time period.

16. The OBU according to claim 13, wherein after receiving the write control instruction sent by the BCC, the processor is further configured to execute the at least one instruction to:

authenticate and decrypt the write control instruction to obtain and store the information comprised in the write control instruction.

17. The OBU according to claim 16, wherein the processor configured to execute the at least one instruction to authenticate and decrypt the write control instruction is configured:

according to a version number of a privilege certificate management key carried in the write control instruction, to select a corresponding privilege certificate management key;

using the selected privilege certificate management key, to perform key diversification on a random number carried in the first request to generate a session key;

using the generated session key, to calculate the version number of the privilege certificate management key and a cipher text comprised in the write control instruction to obtain a Message Authentication Code (MAC);

using the generated session key and upon determining that the obtained MAC is identical to a MAC carried in the write control instruction, to decrypt the cipher text comprised in the write control instruction to obtain an instruction identifier for identifying g type of the current instruction, a random number, the privilege certificate, a certificate number defined by the BCC for the privilege certificate, the key pair, and a time identifier identifying the valid time period of the privilege certificate; and upon determining that the random number carried in the write control instruction is identical to the random number carried in the second request, to store the privilege certificate, the number of the privilege certificate, the key pair and the time identifier.

* * * * *